United States Patent
Adachi et al.

(10) Patent No.: US 8,370,750 B2
(45) Date of Patent: Feb. 5, 2013

(54) TECHNOLOGY FOR GENERATING SERVICE PROGRAM

(75) Inventors: Hisatoshi Adachi, Tokyo (JP); Masao Hara, Kanagawa (JP); Motoharu Inoue, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 648 days.

(21) Appl. No.: 12/594,507

(22) PCT Filed: Apr. 4, 2008

(86) PCT No.: PCT/JP2008/056798
§ 371 (c)(1),
(2), (4) Date: Oct. 2, 2009

(87) PCT Pub. No.: WO2008/126796
PCT Pub. Date: Oct. 23, 2008

(65) Prior Publication Data
US 2010/0131869 A1 May 27, 2010

(30) Foreign Application Priority Data
Apr. 6, 2007 (JP) ................................. 2007-100842

(51) Int. Cl.
*G06F 3/048* (2006.01)
(52) U.S. Cl. ........ 715/738; 715/744; 715/745; 715/760; 715/769; 719/318; 719/320; 719/328; 719/329
(58) Field of Classification Search .................. 715/744, 715/760, 738, 745, 769; 719/318, 320, 328, 719/329
See application file for complete search history.

(56) References Cited

U.S. PATENT DOCUMENTS

| | | | | |
|---|---|---|---|---|
| 5,809,250 A | * | 9/1998 | Kisor | 709/227 |
| 6,189,024 B1 | * | 2/2001 | Bauersfeld et al. | 709/203 |
| 6,195,679 B1 | * | 2/2001 | Bauersfeld et al. | 709/203 |

(Continued)

FOREIGN PATENT DOCUMENTS

| | | |
|---|---|---|
| JP | 10-243854 A | 3/2000 |
| JP | 15-271210 A | 9/2004 |

(Continued)

OTHER PUBLICATIONS

Fumihiro Miyajima, Mikifumi Shikida, A Proposal of User-oriented Web Application Interaction Supporting Method by the Client Program, Article, Mar. 17, 2006, pp. 293-298, vol. 2006, No. 26, Information Processing Society of Japan, Japan.

(Continued)

*Primary Examiner* — Tadeese Hailu
(74) *Attorney, Agent, or Firm* — Lee Law, PLLC; Christopher B. Lee

(57) ABSTRACT

A history acquisition unit acquires a history of operations with a web browser by a user and stores the history in a storage device. A search unit accesses the storage device to search a history of a first operation for inputting a parameter and a history of a second operation performed after the first operation. A generation unit generates a service program that provides services that the user has received through the operations with the web browser, and stores it in the storage device. The service program makes a computer function as: an input acceptance unit that accepts input of a new parameter instead of the parameter input through the first operation; and a processing unit that performs, in response to the new parameter, inputting the new parameter in the web page and processing associated with the second operation beforehand in this stated order with respect to the web browser.

22 Claims, 28 Drawing Sheets

U.S. PATENT DOCUMENTS

| | | | |
|---|---|---|---|
| 6,360,332 B1* | 3/2002 | Weinberg et al. | 714/4.1 |
| 6,535,912 B1* | 3/2003 | Anupam et al. | 709/217 |
| 6,842,755 B2* | 1/2005 | Maslov | 717/115 |
| 7,139,978 B2* | 11/2006 | Rojewski et al. | 715/744 |
| 7,200,804 B1* | 4/2007 | Khavari et al. | 715/230 |
| 7,359,935 B1* | 4/2008 | Karipides et al. | 709/203 |
| 7,653,721 B1* | 1/2010 | Romanov et al. | 709/224 |
| 2004/0111488 A1* | 6/2004 | Allan | 709/217 |
| 2005/0060719 A1* | 3/2005 | Gray et al. | 719/318 |
| 2005/0278728 A1* | 12/2005 | Klementiev | 719/328 |

FOREIGN PATENT DOCUMENTS

| | | |
|---|---|---|
| JP | 15-156376 A | 12/2004 |
| JP | 16-075044 A | 9/2005 |
| JP | 16-224283 A | 2/2006 |
| JP | 17-187401 A | 1/2007 |

OTHER PUBLICATIONS

Sinya Kasaya, Selenium Tool, Article, Feb. 24, 2007, pp. 70-79, vol. 10, No. 4, Nikkei Software, Japan.

Yoshinori Aoki, Fumio Ando, Amane Nakajima, Web Operation Recording and Playback System, Article, Nov. 19, 1999, pp. 25-30, vol. 99, No. 94, Information Processing Society of Japan, Japan.

Yoshinori Aoki, Fumio Ando, Amane Nakajima, Web Operation Recorder and Player, Symposium, Jul. 7, 2000, pp. 501-508, Proceedings of the 7th International Conference on Parallel and Distributed Systems, IEEE, Japan.

Sinya Kasatani, Selenium Core, Selenium IDE, Selenium RC, Article, Jan. 25, 2007, pp. 48-56, Web+DB Press, Japan.

Author Unknown, Selenium Recorder, Website/page http://seleniumrecorder.mozdev.org/index.html, Printed from website on Sep. 11, 2009, pp. 1-3, mozdev.org, Published on the World Wide Web.

Author Unknown, Examiner, State Intellectual Property Office of the People's Republic of China, Office Action for Chinese Counterpart Application Serial No. 200880011053.6, Feb. 23, 2012, pp. 1-10, P.R. China. (English translation not available.).

\* cited by examiner

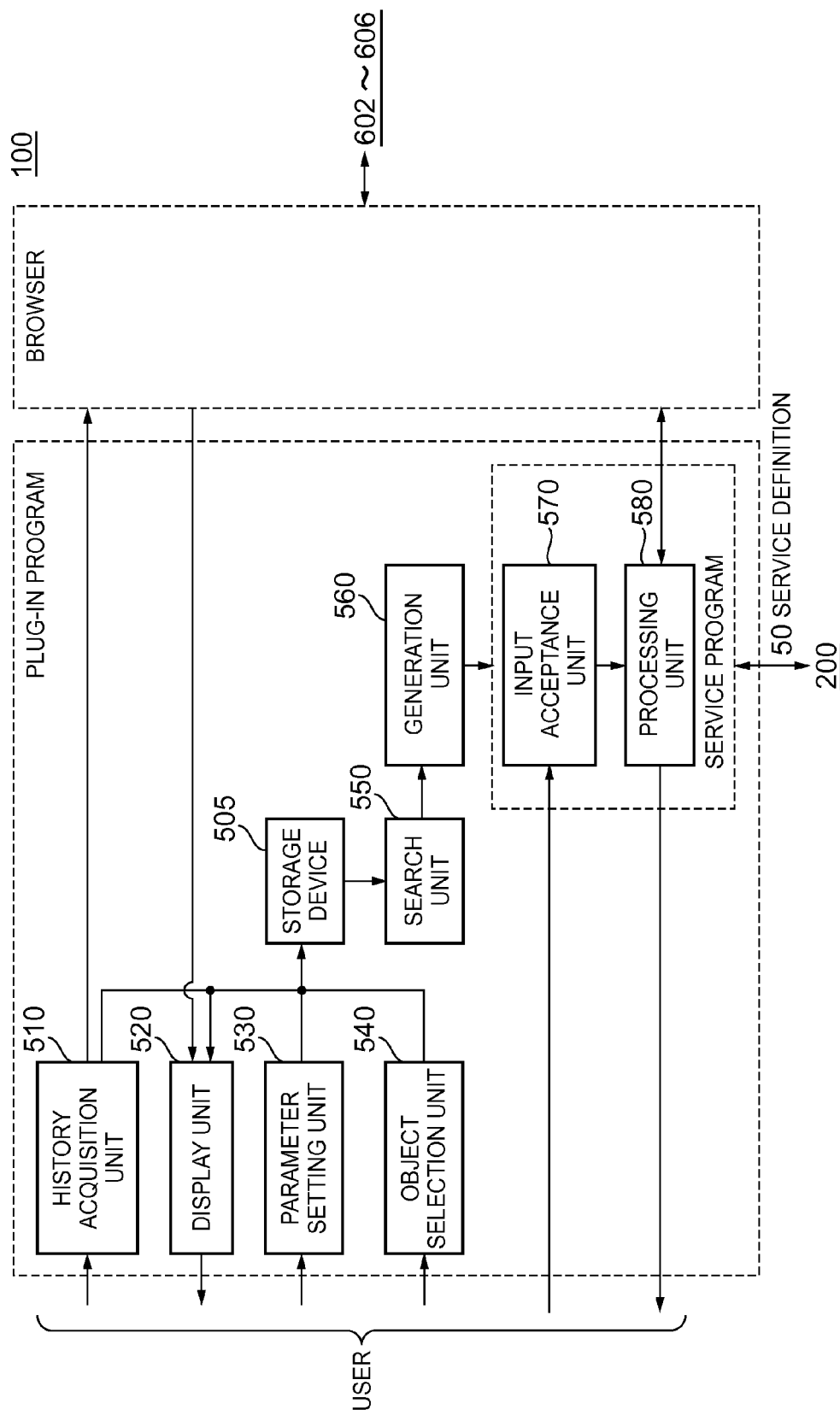

| OPERATION TYPE | LOCATION (XPath) | PARAMETER | LABEL | OPEN |
|---|---|---|---|---|
| OPEN | | http:/xxx/login.htm | | |
| INPUT | //input [@id=user] | testuser | | |
| INPUT | //input [@id=pwd] | testpassword | | |
| CLICK | //link [@id=order] | | | |
| INPUT | //input [@id=code] | 6758 | CODE | ∨ |
| INPUT | //input [@id=market] | Tokyo | | |
| CLICK | //input [@id=order] | | | |
| REFERENCE | //div [@id=unit] | 100 | TRADING UNIT | ∨ |
| REFERENCE | //div [@id=high] | 5,110 | HIGH PRICE | ∨ |
| REFERENCE | //div [@id=low] | 4,980 | LOW PRICE | ∨ |
| INPUT | //input [@id=price] | 5,000 | LIMIT PRICEOPEN | ∨ |
| INPUT | //input [@id=numb] | 200 | NUMBER OF SHARES | ∨ |
| CLICK | //input [@id=order] | | | |

TECHNOLOGY FOR GENERATING SERVICE PROGRAM

BACKGROUND

This application is a National Stage application of International Application No. PCT/JP2008/056798, filed Apr. 4, 2008, the entire contents of which are hereby incorporated by reference as if fully set forth herein. This application also claims the benefit under 35. U.S.C. §119, of Japan Patent Application No. 2007-100842, filed Apr. 6, 2007.

The present invention relates to a technology for generating a program for performing operations on behalf of users. More particularly, the present invention relates to a technology for generating a program for performing operations with respect to a web browser on behalf of users.

In recent years, the concept of mashup has attracted attention, which is for generating a new service by combining services provided by web servers. Mashups may be implemented when an application programming interface (API) for calling up various programs that run in the web servers have been open to public view. Insofar as an API is open to public view, a programmer may create a program for calling up various APIs in free order or under a free condition, so as to create a new service by combining services that have been already available.

Patent Document 1 will be described later.
[Patent Document 1]
Japanese Unexamined Patent Publication (Kokai) No. 2004-272871
[Non-Patent Document 1]
"Usage of Selenium Recorder", homepage uniform resource locator (URL):
"http://seleniumrecorder.mozdev.org/index-ja.html" searched on Apr. 2, 2007

APIs for implementing mashups, however, are on public view simply on a trial basis by some web servers, and a programmer may not be able to combine services available on the Internet freely. Further, even when APIs are on public view, it will be difficult to create a new program unless there are some level of skilled programmers, and it is impossible for general users to create such a program easily.

Meanwhile, a variety of services have been provided on web pages in recent years, and users utilize such services in various ways. Therefore, there may be a possibility that even general users may improve their convenience by combining a plurality of services to create a new service. For instance, if general users may easily create a program enabled to acquire information on stock prices from web pages providing such information, automatically determining a limit price for ordering stocks based on the stock prices, and automatically ordering stocks for the limit price on a web page of a securities firm, the convenience will be improved remarkably for users.

BRIEF SUMMARY

The above-mentioned Patent Document 1 is cited as a reference technology. This technology relates to software that sends a hypertext transfer protocol (HTTP) request to a web server, although the HTTP request is originally sent by a web browser of a terminal. However, since this software is not a web browser itself, various problems occur in sophisticated web pages that are currently on public view.

The first problem concerns appropriate maintenance and control of sessions. In a sophisticated web page, a plurality of HTTP requests are handled as a sequence of sessions, and therefore a HTTP request has to be sent including a session identifier (ID) contained in a previously received HTTP response. This document, however, does not describe or suggest such a function.

The second problem concerns a dynamic change of a web page. Every time an HTTP request is received, a sophisticated web page may change the configuration. This document, however, does not describe or suggest sending an appropriate HTTP request so as to follow a change of a web page.

As another reference technology, software is proposed, which is for recording operations performed on a browser in a window (see Non-Patent Document 1). A test case recorded in the window may be reproduced by clicking Play button. Editing, storing and loading of a test case also are possible in the window. This technology is aimed at examining a web application. Therefore, this technology is not of a type for allowing users to create a reusable program based on such a history of operations.

Therefore, with the foregoing in mind, the present invention provides a system, a method and a program capable of coping with the above-stated problems. This may be achieved by the combination of features recited in independent claims of the present application. Dependent claims further recite favorable specific examples of the present invention.

In order to cope with the above-stated problems, one aspect of the present invention provides a system for generating a service program. The system includes: a storage device; a history acquisition unit that acquires a history of operations with a web browser by a user, and stores the history in the storage device; a search unit that accesses the storage device to search a history of a first operation and a history of a second operation, wherein in the first operation a parameter is input in a web page, and the second operation is another operation performed after the first operation; and a generation unit that generates a service program that provides services that the user has received through the operations with the web browser, and stores the service program in the storage device. The service program makes a computer function as: an input acceptance unit that accepts input of a new parameter that is to be input to the web page instead of the parameter input through the first operation; and a processing unit that performs, in response to the input of the new parameter, processing of inputting the new parameter in the web page and processing associated with the second operation beforehand in this stated order with respect to the web browser. The present invention further provides a program, a program product and a method that make a computer function as such a system. The program product may include, for example, a storage medium for storing the above-mentioned program, or a medium for transmitting the program.

BRIEF DESCRIPTION OF THE SEVERAL VIEWS OF THE DRAWINGS

FIG. 5 is a functional block showing the functions of a client computer 100;
FIG. 6 shows an exemplary data configuration of a storage device 505.

FIG. 9 shows a third display example of the display unit 520;

DETAILED DESCRIPTION

Note here that the above summary of the present invention does not include all of the features necessary to the present invention, and sub-combinations of these feature groups are also contemplated.

The following describes the present invention by way of embodiments. The following embodiments are not intended to limit the scope of the inventions recited in claims, and all of the combinations of the features described in the embodiments are not always essential to means for solving the problems.

Figure 1:
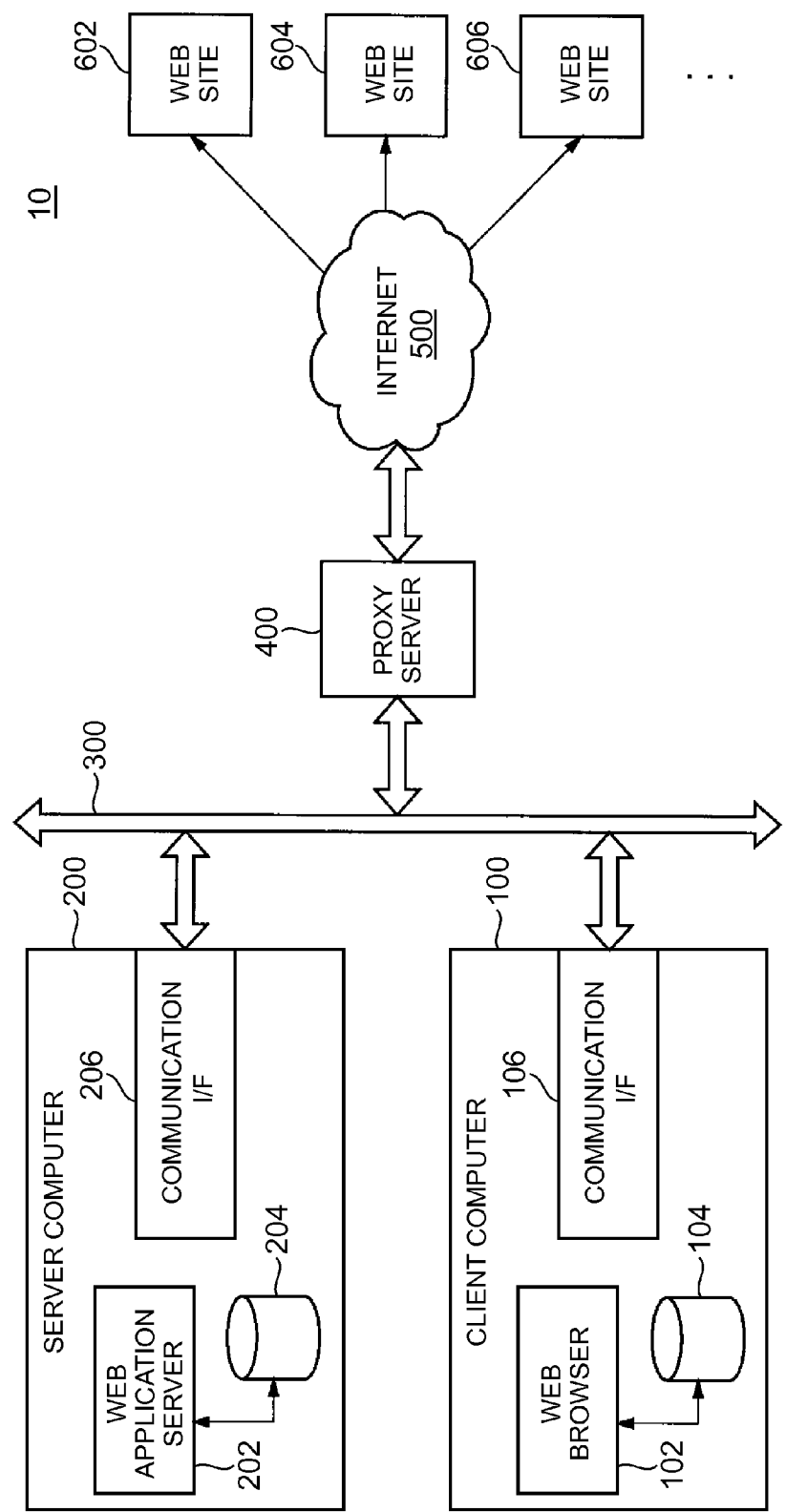
FIG. 1 shows the overall configuration of an information system 10.

FIG. 1 shows the overall configuration of an information system 10. The information system 10 includes a client computer 100, a server computer 200, a communication line 300, a proxy server 400, and a plurality of web servers providing web sites 602 to 606. The client computer 100 is connected with the plurality of web servers via a communication line such as the Internet 500. These web servers run the web sites of web site 602, web site 604, web site 606 and the like. In the client computer 100, a web browser 102 runs, thus allowing access to these web servers in accordance with a user's operations. This access may be conducted by using a hard disk drive 104 as a storage device and a communication interface 106. In order to enhance the efficiency of communication and information security, the proxy server 400 may be provided between the client computer 100 and the Internet 500. Note here that this drawing shows major hardware resource only, and see FIG. 25 described later for a more detailed hardware configuration.

The client computer 100 is further connected with the server computer 200 via the communication line 300 such as local area network. Then, the client computer 100 stores various data generated based on user's instructions in the server computer 200, or reads out various data generated by other users from the server computer 200. In order to implement the functions of storing and reading out data, a web application server 202 runs in the server computer 200. The web application server 202 cooperates with a hard disk drive 204 as a storage device and a communication interface 206 to provide the client computer 100 with data, for example.

The information system 10 according to the present embodiment is aimed to support the easy creation of a program by a general user, so as to allow a variety of services provided by the web sites 602 to 606 to be combined for offering a new service.

Figure 2:
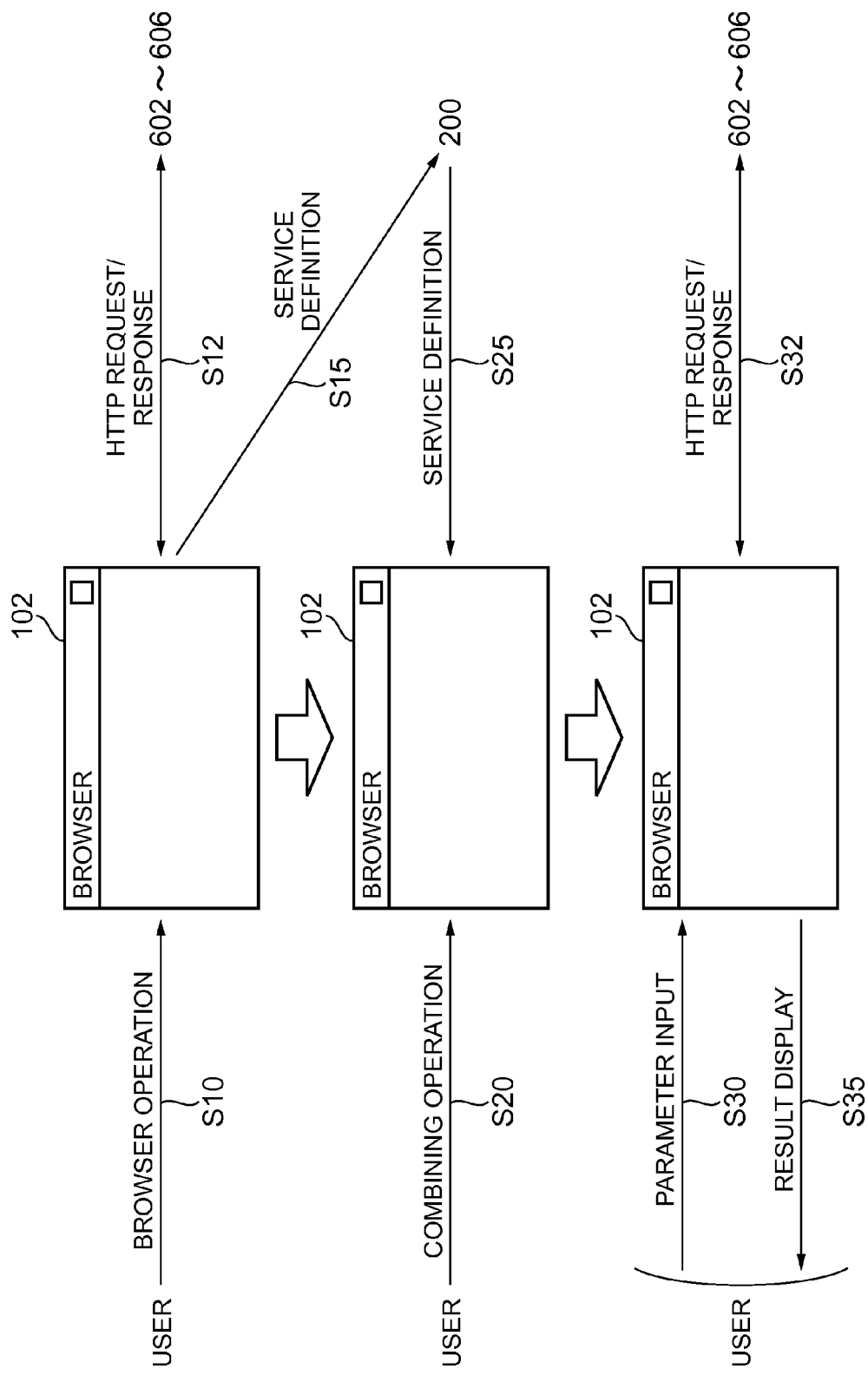
FIG. 2 shows the overall flow of the process performed by the information system 10 in accordance with user's operations.

FIG. 2 shows the overall flow of the process performed by the information system 10 in accordance with the user's operation. When the user operates the web browser 102 (S10), the client computer 100 stores a history of the operation in the hard disk drive 104. Through the operation, the user will receive two or more services from one or more web sites. More specifically, in accordance with the user's operation, the client computer 100 sends a HTTP request to the web sites 602 to 606 and receives a HTTP response from the web sites 602 to 606 (S12). Based on the history of the user's operation with the web browser 102, the client computer 100 generates a service program that provides the services that the user has received through the operation with the web browser. Instead of a service program itself, a service definition may be actually generated, which may be converted into the service program. Then, the client computer 100 sends the service definition as information defining the program to the server computer 200 (s15).

Next, the user operates the web browser 102 to combine a plurality of service programs (S20). As a result, a plurality of service definitions are read out from the server computer 200 (s25) and are read in and combined in the client computer 100, thus forming one application program. The user inputs a parameter in an input field displayed by this application program (S30). In response to the input, the client computer 100 autonomously sends/receives a HTTP request and a HTTP response to/from the web sites 602 to 604 (S32), and displays the result for the user (S35).

Figure 3:
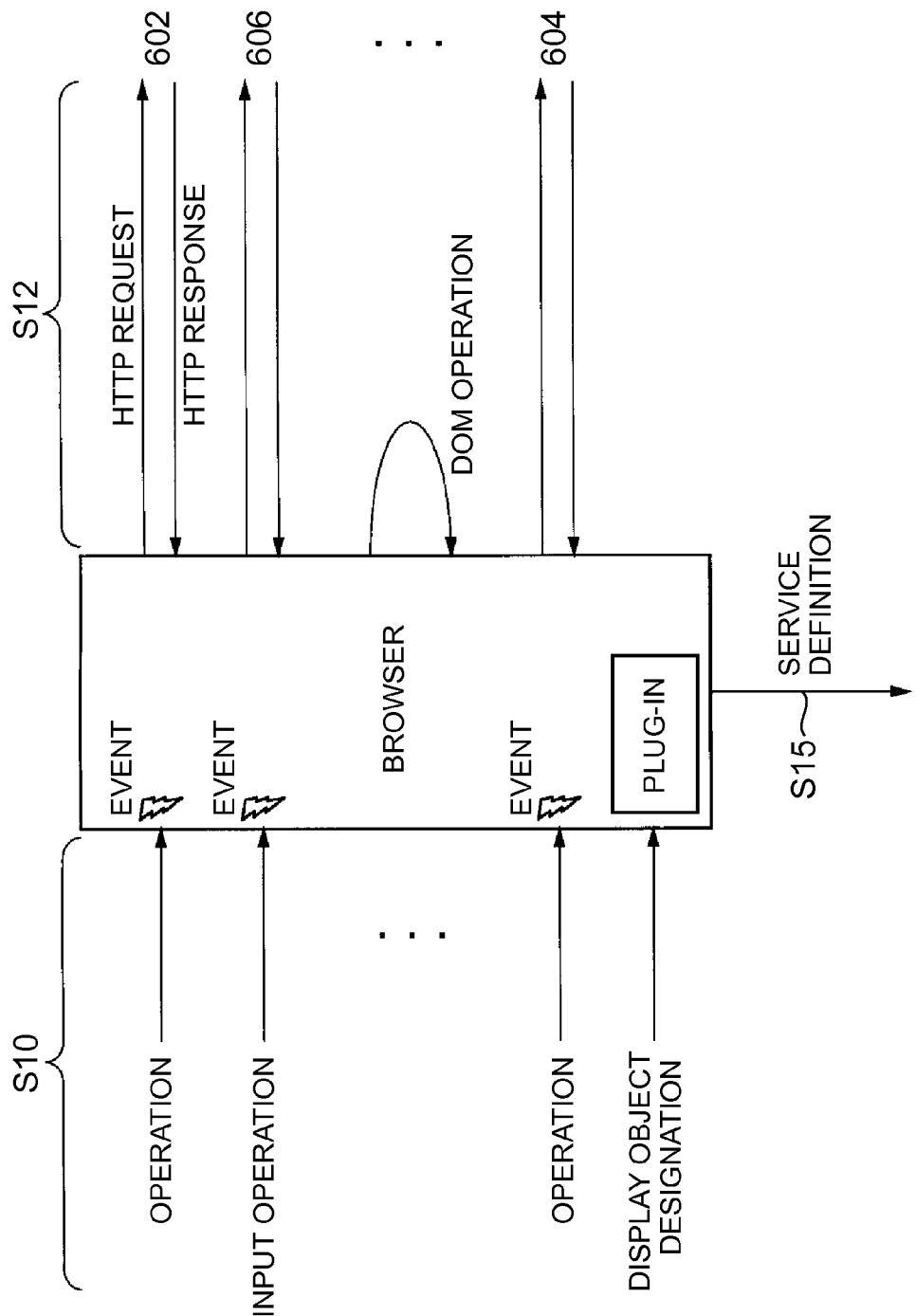
FIG. 3 shows the details of S10 to S15 of FIG. 2.

FIG. 3 shows the details of S10 to S15 of FIG. 2. When the user operates the web browser 102, an event associated with the operation beforehand is generated as internal processing of the web browser 102. For instance, the user clicks a certain region with a pointing device, an event occurred by the click action will be generated. In the case where the clicked region indicates a hyperlink or corresponds to a button causing page transition, the web browser 102 sends a HTTP request. The destination is the web site 602, for example. Upon receipt of a HTTP response, the web browser 102 displays a screen for the user based on the HTTP response.

In the case where the following user's operation is an input operation, an event associated with the input operation beforehand is generated. In this case also, a parameter input is sent as a HTTP request as needed to a web server providing the web site 606 or the like. In this way, every time the user performs an operation, an event is generated inside the client computer 100, and a HTTP request is sent as needed. Even in the case where no HTTP request is sent, a program read in the web browser 102 and running therein (e.g., a program written with a language such as JavaScript supporting a page update function) may update automatically a web page displayed by the web browser 102 (DOM operation in the drawing).

After the completion of a sequence of operations, a user designates a display object arbitrarily from the web page displayed through the operations with the web browser 102. Then, the client computer 100 associates the location of the thus designated display object with the history of the user's operations of the web browser 102, and stores it in the hard disk drive 104. The acquisition and the storage of the history may be embodied by a plug-in program provided in the web browser, for example. Then, the client computer 100 generates a service program running based on this history, and sends a service definition as information indicating a definition of the service program to the server computer 200 (s15).

Figure 4:
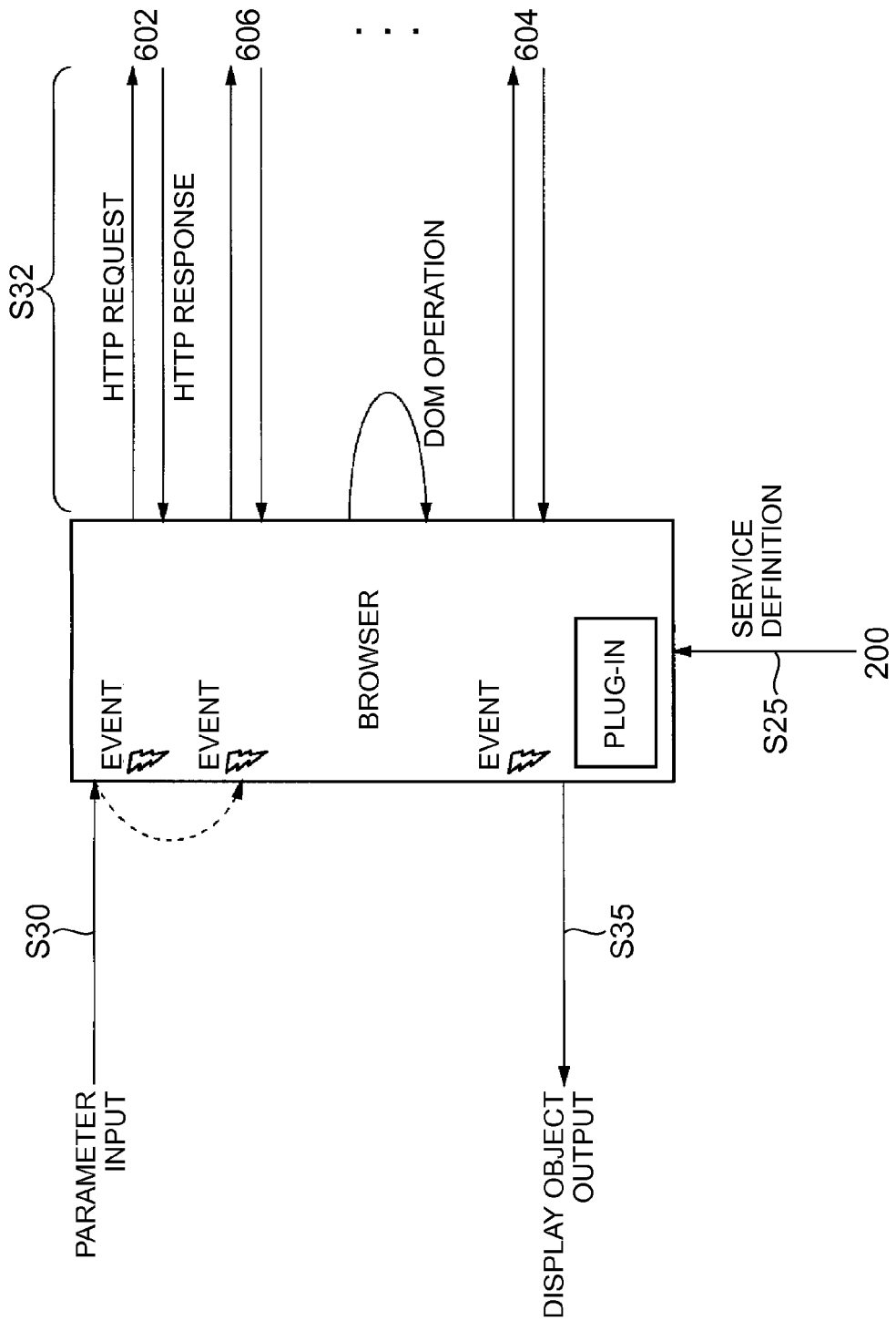
FIG. 4 shows the details of S25 to S32 of FIG. 2.

FIG. 4 shows the details of S25 to S32 of FIG. 2. A service program is created by the user as described above or is combined with another service program read from the server computer 200 (S25), and runs as an application program. This application program runs as a plug-in program of the web browser 102, and displays an input field for the user. When the user inputs a parameter in the input field (S30), the application program generates the events, which have generated during the acquisition of the history, in the generated order one by one. The web browser 102 sends a HTTP request if needed in response to the generation of an event (S32).

After the generation of the events is completed, the service program selects, from the screen of the web browser after the generation of the events, the display object designated by the user during the acquisition of the history, and outputs the same for the user (S35).

In this way, the client computer 100 generates a program that runs in response to the input of a new parameter and based on the user's operations history, and selects the result from the screen and outputs the same, thus performing the operations on behalf of the user and combining a plurality of services. The following describes the details of the function.

FIG. 5 is a functional block showing the functions of the client computer 100. The client computer 100 includes a storage device 505, a history acquisition unit 510, a display unit 520, a parameter setting unit 530, an object selection unit 540, a search unit 550, a generation unit 560, an input acceptance unit 570, and a processing unit 580. These components are embodied by the cooperation of a plug-in program of the web browser 102 with the hardware resource shown in FIG. 25 described later. The storage device 505 is embodied by a hard disk drive 1040 or a RAM 1020 described later, and is provided for storing a user's operations history. The history acquisition unit 510 acquires the history of two or more services that the user receives from one or more web sites through the operations with the web browser 102, and stores the history in the storage device 505.

The display unit 520 displays a first screen and a second screen, where the first screen shows the web browser operated by the user, and the second screen shows the list of operations stored in the storage device 505. For a user's parameter input operation in a web page among the operations acquired as the history, the parameter setting unit 530 sets, based on a user's instruction, whether or not to use the parameter acquired as the history for the processing by the processing unit 580. This instruction may be a click operation with a pointing device with respect to the history displayed on the second screen. Then, the parameter setting unit 530 stores this setting result in the storage device 505.

The object selection unit 540 selects, from the web page displayed on the web browser 102 operated by the user, the display object based on the user's instruction, and associates the location of the display object in the web page with the operations history, and stores it in the storage device 505. The search unit 550 accesses the storage device 505 to search a history of a first operation through which a parameter is input in a web page and a history of a second operation that is another operation performed after the first operation. The generation unit 560 generates a service program that makes the client computer 100 function as the input acceptance unit 570 and the processing unit 580 described later. The service program itself or information defining the service program may be output to the server computer 200, whereas information defining another service program may be read in the client computer 100 and run. The information defining a service program will be exemplified later as a service definition 50.

The input acceptance unit 570 starts to operate in accordance with a user's instruction. Then, the input acceptance unit 570 accepts the input of a parameter from the user that is to be input in the web page instead of the parameter input through the first operation. Herein, the first operation for accepting the input of a new parameter is limited to the first operation in which the parameter acquired as the history is set to be not used for the processing by the processing unit 580. Note here that the input acceptance unit 570 may accept the input of a new parameter not from the user but from another program. That is, for example, this service program may start to run in response to the output of a parameter by another program, and the input acceptance unit 570 may receive this parameter. Then, in response to the input of this new parameter, the processing unit 580 performs the processing of inputting this new parameter in a web page and the processing set for the second operation beforehand with respect to the web browser in this stated order. Such processing may be embodied by generating, in the web browser 102, events that the web browser 102 will generate when undergoing these operations.

FIG. 6 shows an exemplary data configuration of the storage device 505. The storage device 505 stores the history of respective operations by the user as records in the order of the operations performed. Each record contains a type of operation, the location of a target display object in a web page, and an inputted parameter. For instance, for a history of the operation of newly activating a web browser, "open" is stored as the type of operation, and the address of a web page is stored as the input parameter. For a history of a parameter input operation, "input" is stored as the type of operation, "//input[@id=user]" is stored as the location of a target display object, and "testuser" is stored as the input parameter.

The location of the display object is indicated with XPath (extensible markup language (XML) Path Language), for example. In the notation of XPath, "//" indicates any tag located in any hierarchical level in a XML document as a whole. The character string following "//" indicates a tag name. The character string following @ indicates an attribute name. That is, "//input[@id=user]" indicates, among tags of input located in any hierarchical level of a XML document as a whole, a tag whose attribute of "id" is user. The history acquisition unit 510 acquires such notation in XPath as information indicating the location of the display object that is an object of the user's operation, and stores the same in the storage device 505.

The storage device 505 further may store a label to be included in the history of the user's input operations, where the label is provided in the web page where the user inputs a parameter so as to allow the user to recognize an input field for inputting the parameter. This label may be a character string that is displayed next to the input field for allowing the user to understand easily as to what should be input in the input field. For instance, when the character string of "the number of shares" is displayed next to an input field and the numerical value "200" is input in the input field, the label "the number of shares" is stored to be further associated with the type of operation, the location of a target display object, and the parameter "200".

The storage device 505 further may store, for the history of an input operation, information as to whether a parameter input through the operation is to be used as it is for the processing by the processing unit 580. In the drawing, this information is indicated with "√" in the field of "open." That is, for the operations history with the "open" field with "√," a new parameter is required instead of the parameter input through the operation. On the other hand, for the operations history without "√" in the "open" field, the parameter input through the operation is used as it is for the processing by the processing unit 580, where any new parameter is not requested and moreover the parameter itself will not be open to the public view.

The storage device 505 further may store, in association with the operations history, information indicating the location of a display object to be displayed as a result of the operations performed on behalf of the user. In the drawing, the information on such a location is indicated with the entry of "reference." That is, an entry of "reference" is associated with the history of operations performed prior to the operation of the entry, and indicates to select a desired display object from the web page displayed as a result of these operations performed on behalf of the user and display it for the user.

Figure 7:
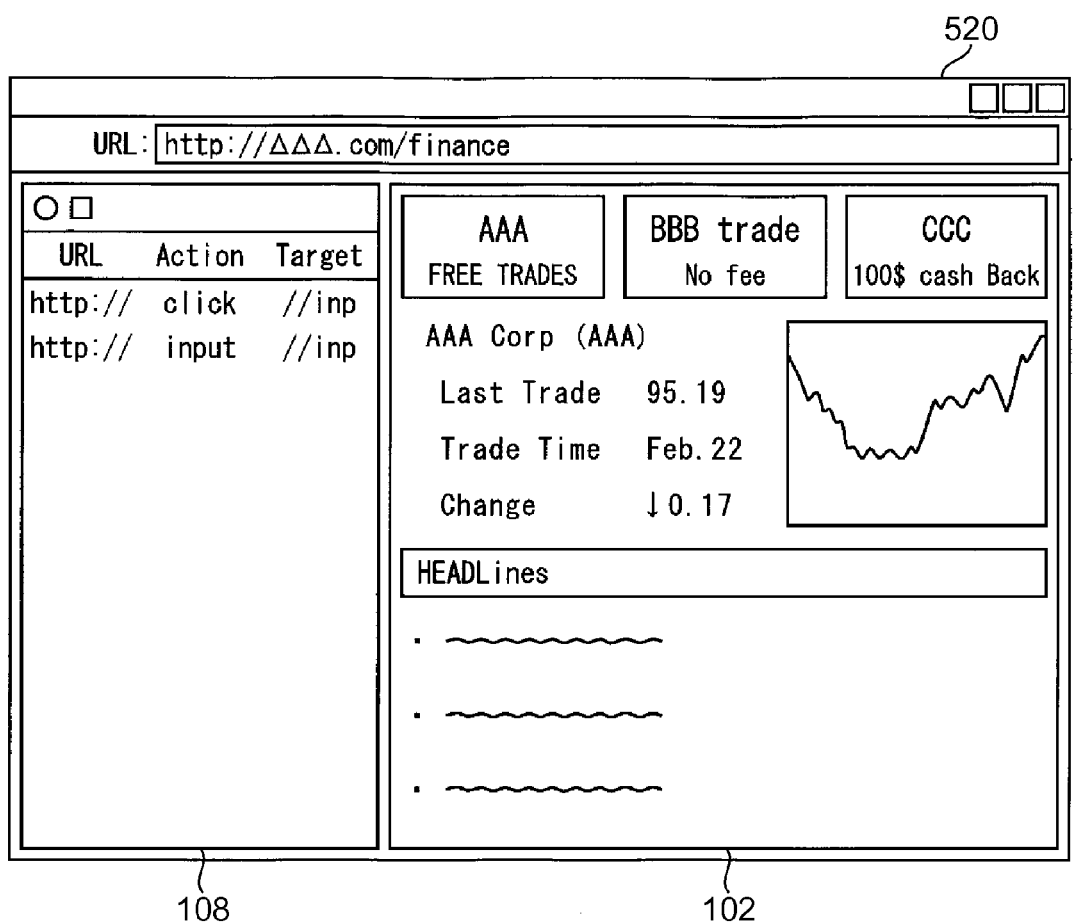
FIG. 7 shows a first display example of a display unit 520.
Figure 8:
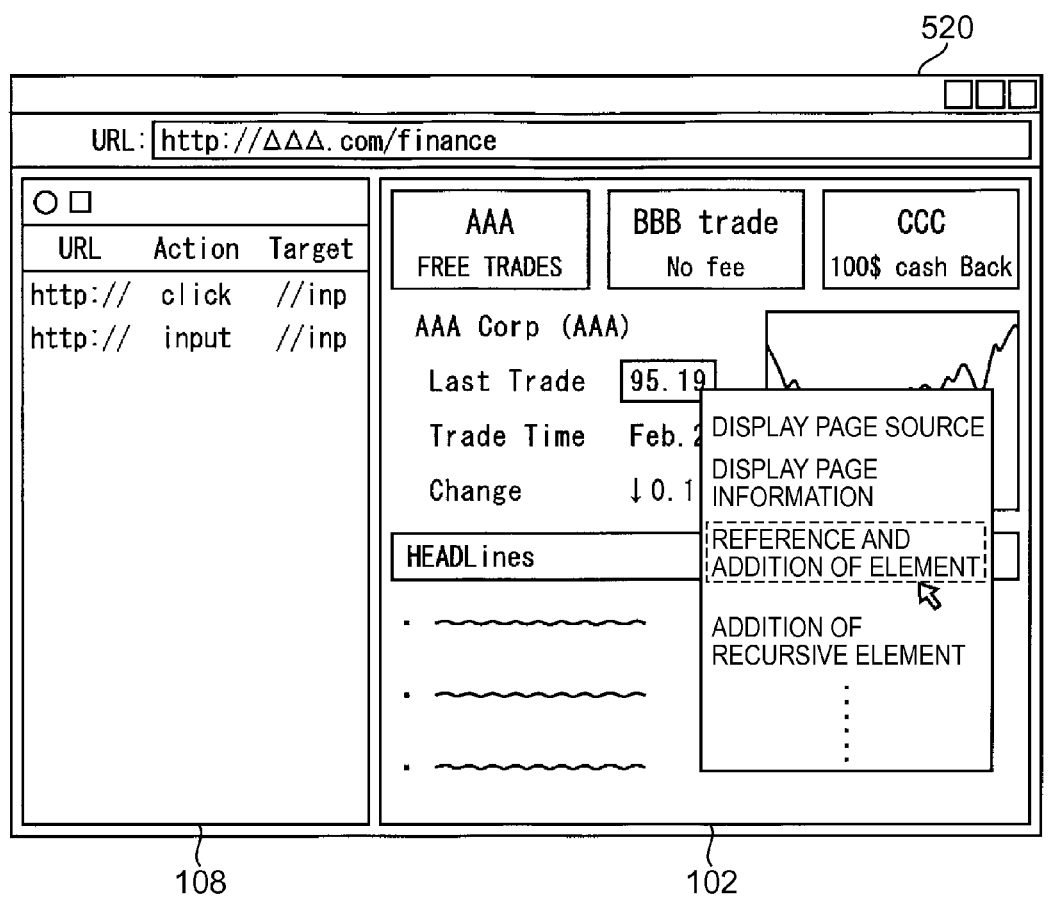
FIG. 8 shows a second display example of the display unit 520.
Figure 9:
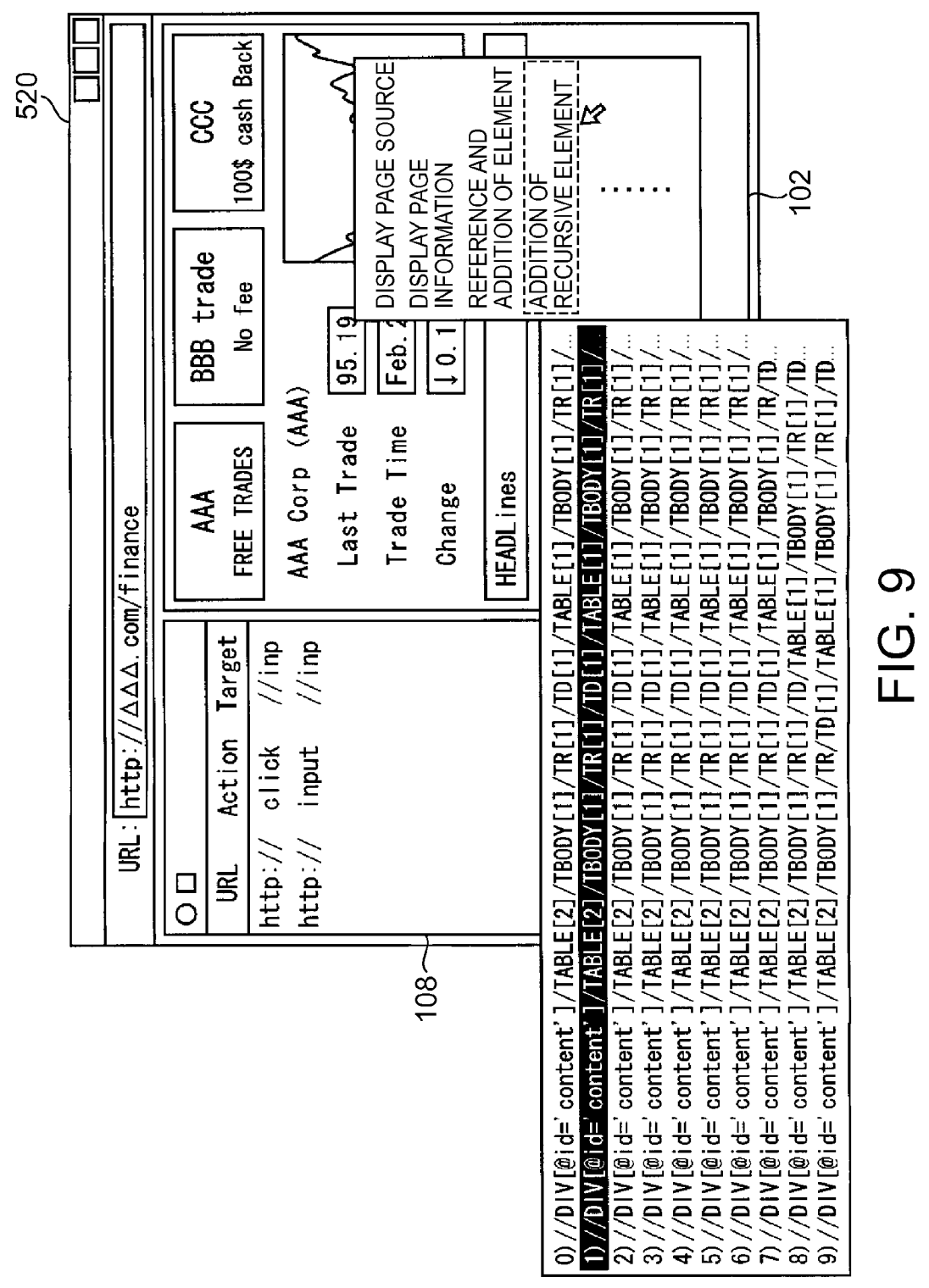

Referring now to FIGS. 7 to 9, an example of the work by a user of editing the history and functions relating to the work will be described below.

FIG. 7 shows a first display example of the display unit 520. The display unit 520 displays a web browser 102 as a first screen and a history display screen 108 as a second screen. The web browser 102 is similar to an already-existing web browser. That is, the web browser 102 reads a file from the uniform resource locator (URL) address input in the address input field indicated with "URL:". This file stores data indicating the tree-structure arrangement of a plurality of display objects that are displayed as a web page. More specifically, this file may be written in HTML (Hyper Text Markup Language) or XML (eXtensible Markup Language) that is a language for describing data in a structured manner. Then, the web browser 102 reads this file and performs syntax analysis of it, thereby displaying the web page including these display objects.

Meanwhile, the history display screen 108 displays a history of the operations by the user with the web browser 102. More specifically, in response to the click of a circle button in the history display screen 108 with a pointing device or the like, the history acquisition unit 510 starts to acquire the history. The history acquisition unit 510 acquires the history of the operations by the user with the web browser 102 after start, and stores them in the storage device 505 one by one. Insofar as it concerns the history of user's operations with the web browser 102, even if the operations are conducted across a plurality of web sites for example, such operations will be stored as a set of history in the storage device 505. The stored history is displayed on the history display screen 108. In response to the click of a square button in the history display screen 108, the history acquisition unit 510 stops the acquisition of the history, and stores the result as a file.

A user may edit a history on the history display screen 108 freely. For instance, a user may perform a drag-and-drop operation of a certain history within the history display screen 108 so as to change the operational order with another history. A user may delete a certain history. In response to these operations, the history acquisition unit 510 changes the order of the histories stored in the storage device 505, or deletes the history from the storage device 505. Furthermore, on the history display screen 108, a user may edit a label stored to be included in the history. The parameter setting unit 530 may accept on this history display screen 108 a setting concerning whether a parameter acquired as the history is to be used as it is for the processing by the processing unit 580. For instance, every time a user clicks a certain history indicated as a list on the history display screen 108, the setting of using a parameter acquired as the history as it is for the processing by the processing unit 580 (i.e., the above-described setting of "not open to public view") and the setting of accepting the input of a new parameter (i.e., the above-described setting of "open to public view") may be switched alternately.

FIG. 8 shows a second display example of the display unit 520. When a user clicks a display object in the web browser 102, the web browser 102 displays a context menu. The item "Reference and addition of element" in the context menu means an instruction for associating a display object to be displayed as a result of the operations performed on behalf of the user with the history. For instance, when the user selects the display object of "95.19" and selects the "Reference and addition of element", the object selection unit 540 acquires the location of the display object of "95.19," associates it with the history displayed on the history display screen 108, and stores it in the storage device 505. As a result, the processing unit 580 selects a display object located at this associated location from the web page displayed through the associated operations performed on behalf of the user, and outputs the same as a result of the processing corresponding to the associated operations. The selected display object may be displayed for the user, or may be output to another program, which may be used as the input of the another program.

The association operation may be embodied by the selection from the above-stated context menu, or alternatively may be embodied by a drag-and-drop operation with a pointing device, for example. That is, when accepting an operation of dragging a display object such as "95.19" and dropping it in the history on the history display screen 108, the object selection unit 540 may acquire the location of the display object, associate it with the history, and store it in the storage device 505. In this way, any type of operations may be performed insofar as a user may instruct the association through the operations.

In the case where the display object is a recursive element, it may be desired that such display elements may be collectively acquired as an array. Referring now to FIG. 9, a function allowing a large number of display objects to be selected with efficiency will be described.

FIG. 9 shows a third display example of the display unit 520. When a user designates a display object and selects the item "addition of recursive element" from the context menu, a plurality of display objects relating to this are selected collectively. More specifically, the object selection unit 540 selects, in addition to the display object designated by the user, other display objects that share an ancestor display object with the designated display object.

In the case where there are a plurality of ancestor display objects, a plurality of candidates will exist as the other display objects selected in addition to the designated display object. For instance, in the case where the display object of specified with XPath of "//body/table[1]/tdoby[1]/tr[1]/td[1]//" is designated, there are the display object "//body/table[1]/tbody [1]/tr[1]" as well as "//body/table[1]/tbody[1]", "//body/table [1]" as the ancestors in the tree-structure of the document, for example. Herein, in the notation of XPath, the parentheses following an element name indicates the appearance order of the element. For instance, even when a plurality of elements "tr" are arranged, the notation of tr[2] may uniquely designate the second element among the elements. Therefore, depending on what ancestor is set in common with the display object, a plurality of candidates may exist as other display objects.

In this case, the object selection unit 540 may display, for each of the plurality of candidates, the location of the display object in the context menu. For instance, the XPath of "//body/table[1]/tbody[1]/tr[1]/td" indicates all "td" tags that share "//body/table[1]/tbody[1]/tr[1]" as their ancestor. Thus, the object selection unit 540 may display, as one of the candidates for selection, the XPath indicating a plurality of tags collectively as a list.

In addition to the above-stated example of XPath, the object selection unit 540 may further display each display object as a candidate for selection by surrounding it with a box in the web browser 102, which is for allowing the user to understand easily as to which display objects are shown as the candidates for selection. For instance, in the exemplary screen of FIG. 9, in addition to the display object "95.19" originally designated, the display object of "Feb. 22" and the display object "↓10.17" are displayed, which are surrounded with a box. At this time, when the user releases the button of the pointing device, the object selection unit 540 selects these objects collectively.

In this way, according to the example of FIG. 9, even when there are a plurality of display objects that share their ancestor in the tree-structure, and the number of their display objects is variable, these display objects may be designated collectively beforehand. A set of the display objects designated collectively may be processed not as output data in number of the objects, but as array-type output data as a group.

Figure 10:
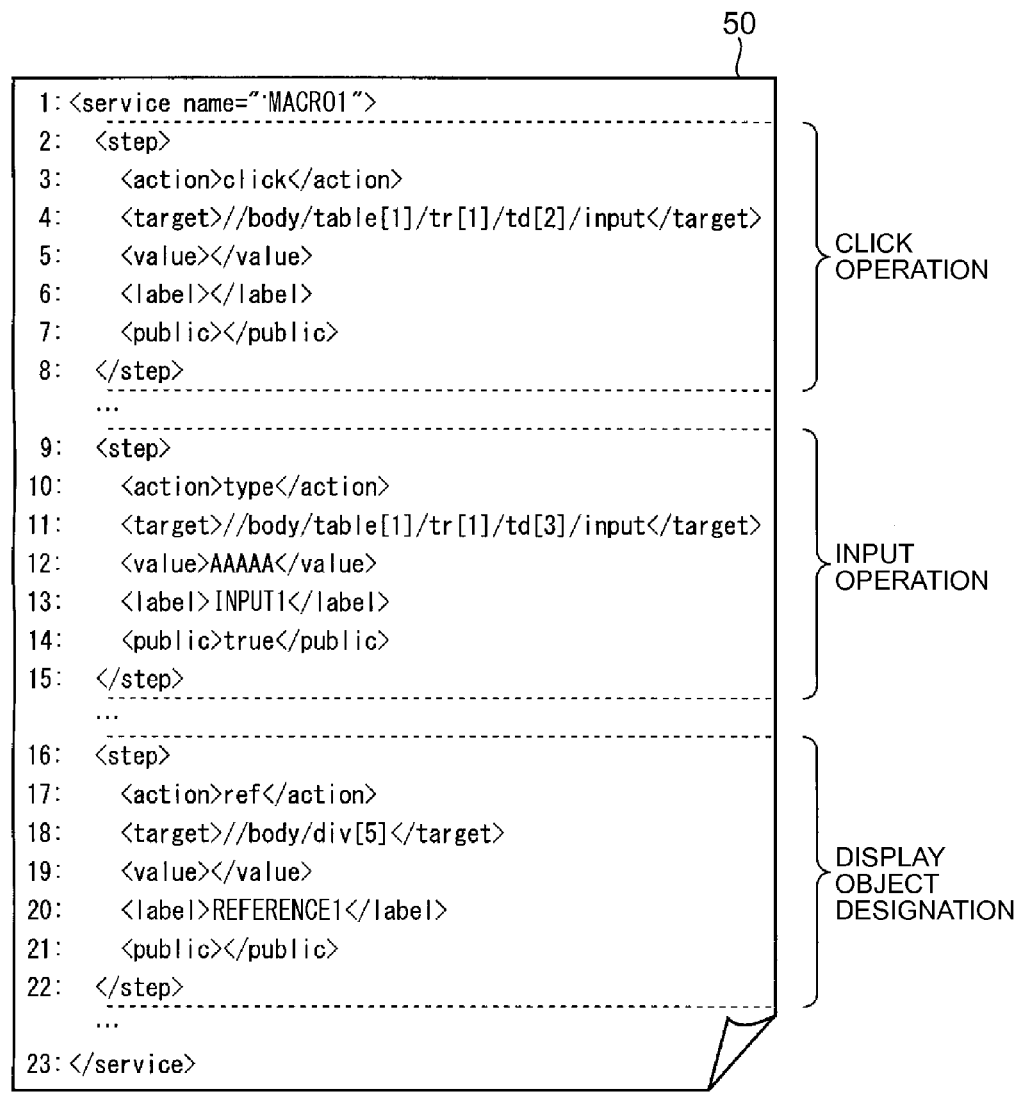
FIG. 10 shows a specific example of a service definition 50.

FIG. 10 shows a specific example of the service definition 50. The service definition 50 is information defining a service program that is for performing operations on behalf of a user. In the service definition 50, the events to be generated inside the web browser 102 when a service is provided are recorded in the generated order, as well as a name of the service offered by the service program. Each event is, for example, defined by the description between a start-tag of <step> and an end-tag </step>. As a specific example, an event generated when the web browser 102 undergoes a click operation is described between line 2 and line 8. The <action> tag at line 3 indicates a type of the event, "click". The <target> tag at line 4 indicates a display object as an object causing the event. Lines 5 to 7 are for the definition of an input parameter, a label and the like, although they are not defined in this example.

Lines 9 to 15 define an event to be generated when the web browser 102 undergoes a parameter input operation in the web page. Line 10 defines a type of the event, "type," and line 11 defines the location of the display object where the parameter is input. Line 12 defines a parameter to be input, and line 13 defines a label that is a character string to be displayed in association with the input field. Line 14 defines whether or not to display this input field.

Each event is generated by the generation unit 560 based on the history of user's operations with the web browser 102. For instance, based on the history of user's clicking of the web browser 102, the generation unit 560 defines the generation of an event of a type "click," and records the same to be included in the service definition 50. Further, based on the history of the user's parameter inputting operation in the web page with the web browser 102, the generation unit 560 defines the generation of an event of a type of "type," and records the same to be included in the service definition 50. In addition to this, the client computer 100 may control this service definition 50 while editing this with a text editor or the like. Thereby, a user of some programming ability is allowed to modify the service created from the history easily, to form more desirable different service.

The service definition 50 also defines a display object to be displayed as a result of the operations performed on behalf of a user. For instance, in the case where the object selection unit 540 has selected a display object located at a certain location as the display object to be displayed as a result of the operations performed on behalf of a user, the generation unit 560 defines the generation of an event indicating that the display object at the location is to be selected among the display objects displayed as a result of the operations performed on behalf of the user and to be output. More specifically, lines 16 to 22 define the type of an event "ref". This event indicates to select the display object at the location specified with the <target> tag at line 18 from the web page. The display object to be displayed as a result will be displayed in association with the character string of "reference1" defined at line 20.

The service definition exemplified as above is converted by an interpreted or a compiled language processor into a service program that runs directly on the client computer 100, which is executed by the client computer 100. Then, this service program makes the client computer 100 function as the input acceptance unit 570 and the processing unit 580. Additionally, the service definition may be sent to the server computer 200 and be stored therein. Conversely, another service definition stored in the server computer 200 may be read in the client computer 100 and executed thereby.

Figure 11:
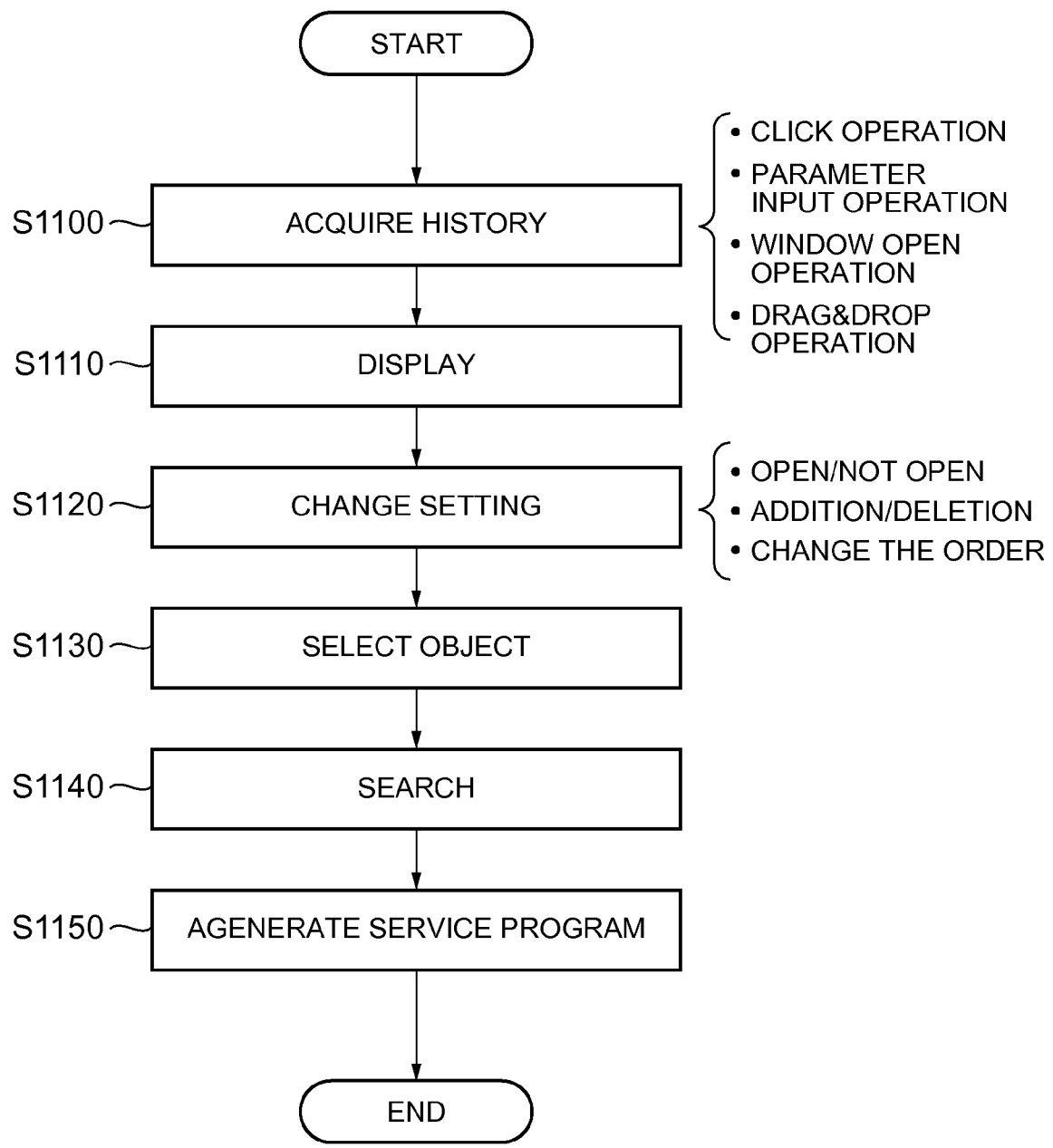
FIG. 11 shows the flow of the processing by the client computer 100 to generate a service program based on the operations history.

FIG. 11 shows the flow of the processing by the client computer 100 to generate a service program based on the operations history. The history acquisition unit 510 acquires the history that the user receives two or more services from one or more web sites through the operations with the web browser 102, and stores the history in the storage device 505 (S1100). For instance, the history acquisition unit 510 may acquire, as a history, a set of a click operation with a pointing device and the location of a display object clicked with the pointing device. The history acquisition unit 510 may acquire, as a history, a set of a parameter input operation, the location of a display object where a parameter is input, and an input parameter. In this case, the history acquisition unit 510 may further acquire a label provided to the input field of the parameter. The history acquisition unit 510 may acquire, as a history, a set of a web browser activating operation, and an address of a web page to be displayed in the activated web browser. Furthermore, the history acquisition unit 510 may acquire, as a history, a set of a drag-and-drop operation of a display object, identification information on a display object to be dragged, and identification information on a display object as a dropping target.

The display unit 520 displays a list of the operations stored in the storage device 505 on the history display screen 108 (S1110). Then, the client computer 100 accepts operations concerning various setting changes of the operations indicated by the history (S1120). For instance, for a user's parameter input operation in a web page among the operations acquired as the history, the parameter setting unit 530 sets, based on a user's instruction, whether or not to use the parameter acquired as the history as it is for the processing by the processing unit 580. For an operation of always inputting the same parameter, the setting for using the parameter as it is for the operation may omit a step of inputting the same parameter every time when the operation is performed on behalf of the user. The history acquisition unit 510 may accept an operation of adding or deleting the history partially, or an operation of changing the operational order. Thereby, the history of an error in operation during the acquisition of the history may be deleted, and therefore even when an error in operation occurs, there is no need to repeat the history acquisition from the beginning, which is useful for users. The history acquisition unit 510 further may accept an operation of editing a label that is acquired to be included in the history. Thereby, a display that is easy to understand may be provided with consideration given to later utilization.

The object selection unit 540 selects a display object based on a user's instruction from the web page displayed on the web browser 102 that the user operates, associates the location of the display object in the web page with the history of operations, and stores the same in the storage device 505 (S1130). The search unit 550 accesses the storage device 505 to search a history of a first operation in distinction from a history of a second operation, where in the first operation a parameter is input in the web page, and the second operation as another operation is performed after the first operation (S1140). The generation unit 560 generates a service program making the client computer 100 function as the input acceptance unit 570 and the processing unit 580 described later (S1150).

Figure 12:
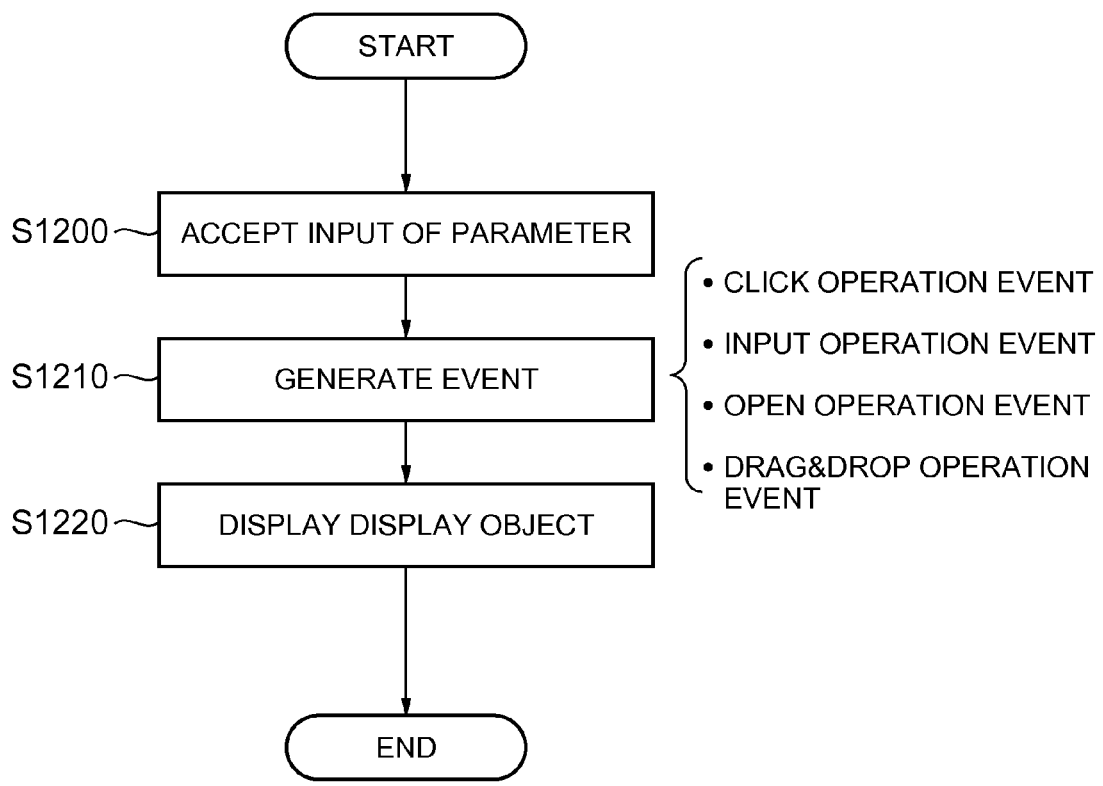
FIG. 12 shows the flow of the operations performed by the client computer 100 on behalf of the user based on a service program.

FIG. 12 shows the flow of the operations performed by the client computer 100 on behalf of the user in accordance with the service program. In response to an instruction to perform the operations on behalf of the user, the client computer 100 firstly activates a web browser. Since the web browser is activated temporarily for implementing the processing by the processing unit 580, it is desirable to set that the web browser is invisible or is less-visible to the user. Then, the client computer 100 performs the following operations with respect to this web browser. The input acceptance unit 570 accepts the input of a new parameter for the first operation with the setting such that the parameter acquired as the history is not used for the processing by the processing unit 580 (S1200). More specifically, the input acceptance unit 570 displays the input field for letting this new parameter input, and may display a character string indicated by the label acquired to be included in the history of the first operation in association with the input field. On the other hand, the input acceptance unit 570 does not accept the input of a new parameter for the first operation with the setting such that the parameter acquired as the history is used for the processing by the processing unit 580.

In response to the input of this new parameter, the processing unit 580 executes the process of inputting this new parameter in the web page and the process predetermined as the second operation that is to be performed after the first operation in this stated order one by one (S1210). Such processing may be embodied by sending an instruction to the web browser 102, so as to make the web browser 102 generate the events that the web browser 102 will generate when undergoing these operations. More specifically, an event may be generated by calling up API (Application Programming Interface) generating the event, where the API includes, as arguments, a type of the event to be generated, a parameter to be input, the location of a display object as an object causing the event and the like. This API may be offered by a plug-in program or may be offered by the web browser 102 or an operating system.

A specific example of an individual operation is as follows. For a first operation with a setting such that the parameter acquired as the history is not used for the processing by the processing unit 580, the processing unit 580 calls up API for generating the event in the web browser, where a type of the event to be generated when the parameter is input, the location of the display object where the parameter is input, and an input new parameter are set as arguments. For a click operation, the processing unit 580 calls up the API for generating the event in the web browser, where the location of a display object clicked with a pointing device, and a type of the event to be generated in response to the click with the pointing device are set as arguments.

For a first operation with a setting such that the parameter acquired as the history is not used for the processing by the processing unit 580, the processing unit 580 calls up the API for generating the event in the web browser, where a type of the event to be generated when the parameter is input, the location of the display object where the parameter is input, and a parameter stored as the history are set as arguments. For a drag-and-drop operation, the processing unit 580 calls up the API for generating the event in the web browser, where a type of an operation indicating a drag-and-drop operation, identification information on a display object to be dragged, and identification information on a display object as a dropping target are set as arguments. Further, for a web browser activation operation, the processing unit 580 calls up the API for generating the event in the web browser, where an address of a web page is set as an argument.

Then, the processing unit 580 selects, from the web page displayed on the web browser that the user performs the operations, a display object corresponding to the location stored associated with the operations history, and displays it as a result of the operations performed on behalf of the user (S1220).

Figure 13:
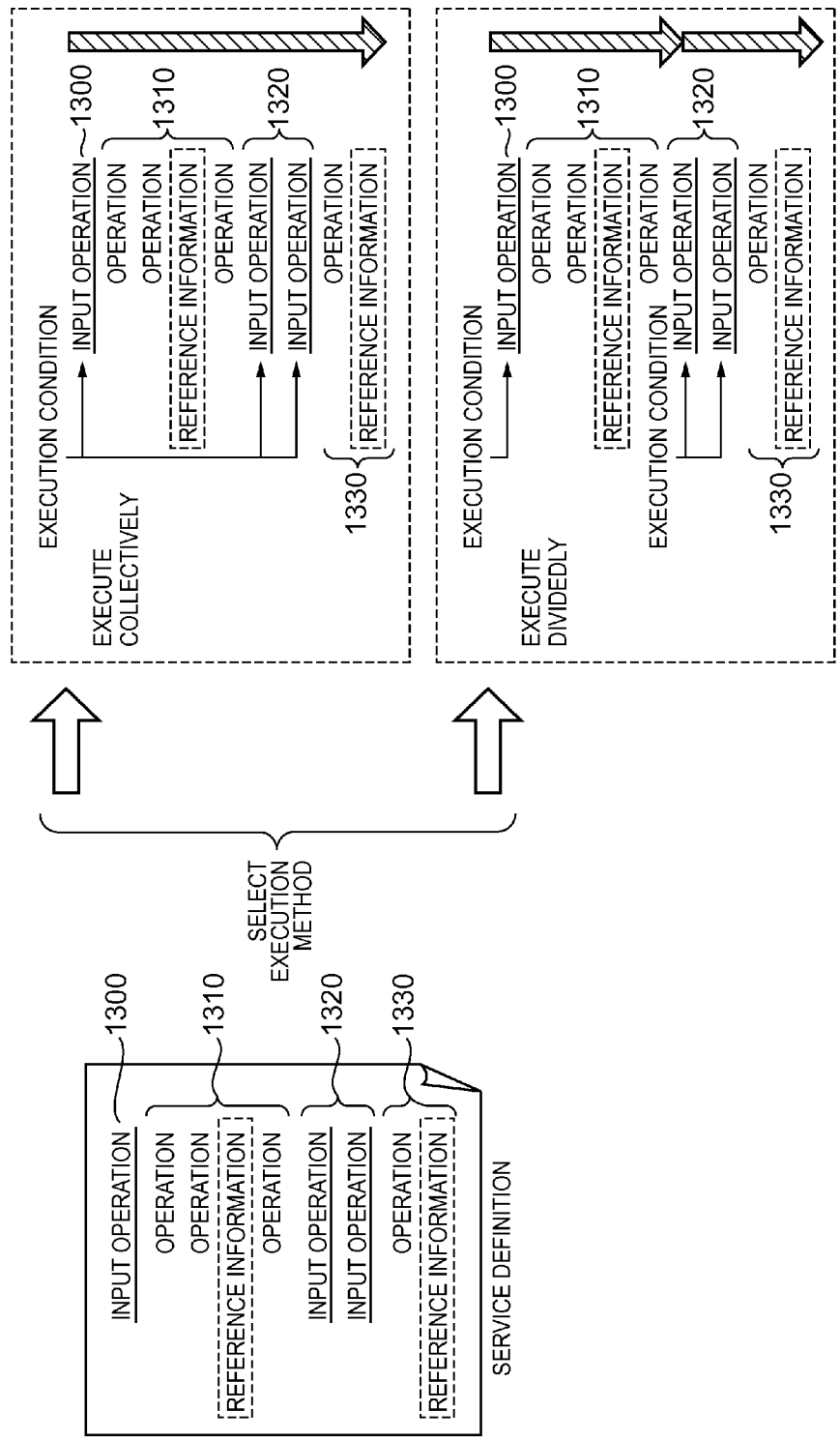
FIG. 13 shows the comparison between two operation examples based on the operations history.

FIG. 13 shows the comparison between two operation examples based on the operations history. As shown in the left side of FIG. 13, the history including a plurality of input operations is acquired, and a plurality of display objects to be displayed as a result of the operations performed on behalf of the user are set. In this case, the search unit 550 firstly detects a first operation 1300 as an input operation. Then, the search unit 550 detects, as a second operation 1310, an operation performed after the first operation and before the next input operation following the operation in which a display object to be displayed as a result of the operations performed on behalf of the user is set. In addition, the search unit 550 detects a following third operation 1320 as an input operation and a fourth operation 1330 that is another operation performed after the third operation. In this case, the client computer 100 selectively conducts an operation of performing the operations collectively on behalf of the user after all of the parameters are input or an operation of performing the divided operations partially on behalf of the user every time a part of the parameters is input.

The case of performing operations collectively on behalf of the user is as follows. The input acceptance unit 570 accepts, in addition to a new parameter to be input in a web page instead of the parameter input through the first operation 1300, the input of a new parameter from a user that is to be input in the web page instead of the parameter input through the third operation 1320. In response to the input of these parameters, the processing unit 580 performs, with respect to the web browser, inputting a new parameter corresponding to the first operation 1300 in the web page, the processing associated with the second operation 1310 beforehand, inputting a new parameter corresponding to the third operation 1320 in the web page, and the processing associated with the fourth operation 1330 beforehand in this stated order. In this way, in the operation of performing operations collectively on behalf of the user, the operation starts after new parameters corresponding to all of the input operations have been input.

The operation of performing the divided operations partially on behalf of the user is as follows. The input acceptance unit 570 firstly accepts the input of a new parameter from a user that is to be input in the web page instead of the parameter input through the first operation 1300. Then, in response to the input of this new parameter, the processing unit 580 performs, with respect to the web browser, the process of inputting this new parameter in the web page and the processing associated with the second operation 1310 beforehand in this stated order. At this time, if the display object to be displayed as a result of the operations has been already set in the operations performed on behalf of the user, the processing unit 580 selects the display object from the web browser displayed through the operations performed on behalf of the user, and displays it for the user.

Next, in response to the processing by the processing unit 580 associated with the second operation 1310 beforehand, the input acceptance unit 570 further accepts the input of a new parameter from a user that is to be input in the web page instead of the parameter input through the third operation 1320. Then, in response to the input of this new parameter, the processing unit 580 performs, with respect to the web browser, inputting this new parameter in the web page and the processing associated with the fourth operation 1330 beforehand in this stated order. In this way, in the operation of performing the divided operations partially on behalf of the user, if a new parameter corresponding to a part of the input operation is input, the processing corresponding to a part of the operations enabled by the new parameter starts.

To divide the operations performed on behalf of a user enables the following application, for example. A user inputs a stock code in a web page providing information through the first operation 1300 in order to obtain information on stock prices. Thereafter, the user performs the second operation 1310 to display a target stock price. The user sees the stock price and judges how stocks are ordered and at what a stock price stocks are to be ordered. Then, the user inputs an order price and an order method in a web page of a securities firm through the third operation 1320. Through the fourth operation 1330, a result of the order and a result of agreement are displayed for the user. When the above-described operations are performed on behalf of the user, the second operation 1310 and the fourth operation 1330 preferably may be performed automatically because these operations would be independent of user's judgment and stock price information. However, it is desirable to let the user input a new parameter for the first operation 1300 and the third operation, which are based on user's judgment, every time these operations are performed on behalf of the user. Further, among parameters input through the third operation 1320, an order price, for example, is determined by the user depending on a result of the second operation. By dividing the operations performed on behalf of the user, such user's needs are filled, and if user's judgment is required, the operations performed on behalf of the user may be stopped in order to request the user to input a new parameter.

That is the description of processing and functions that support the creation of a service program for performing operations on behalf of the user, with reference to FIGS. 1 to 13. With these processing and functions, it is possible for a general user to create a service program with a simple operation, the service program enabling the operations performed on behalf of them. Since this service program enables the operations performed on behalf of the user and not a HTTP request made on behalf of the user, the operation of a web page that changes dynamically in configuration, which has become widespread in recent years, and the operation across a plurality of web pages may be reproduced faithfully. According to such a program enabling the reproduction of operations, even when a plurality of existing services are provided by two or more web sites, a new service may be offered by combining these services.

Figure 14:
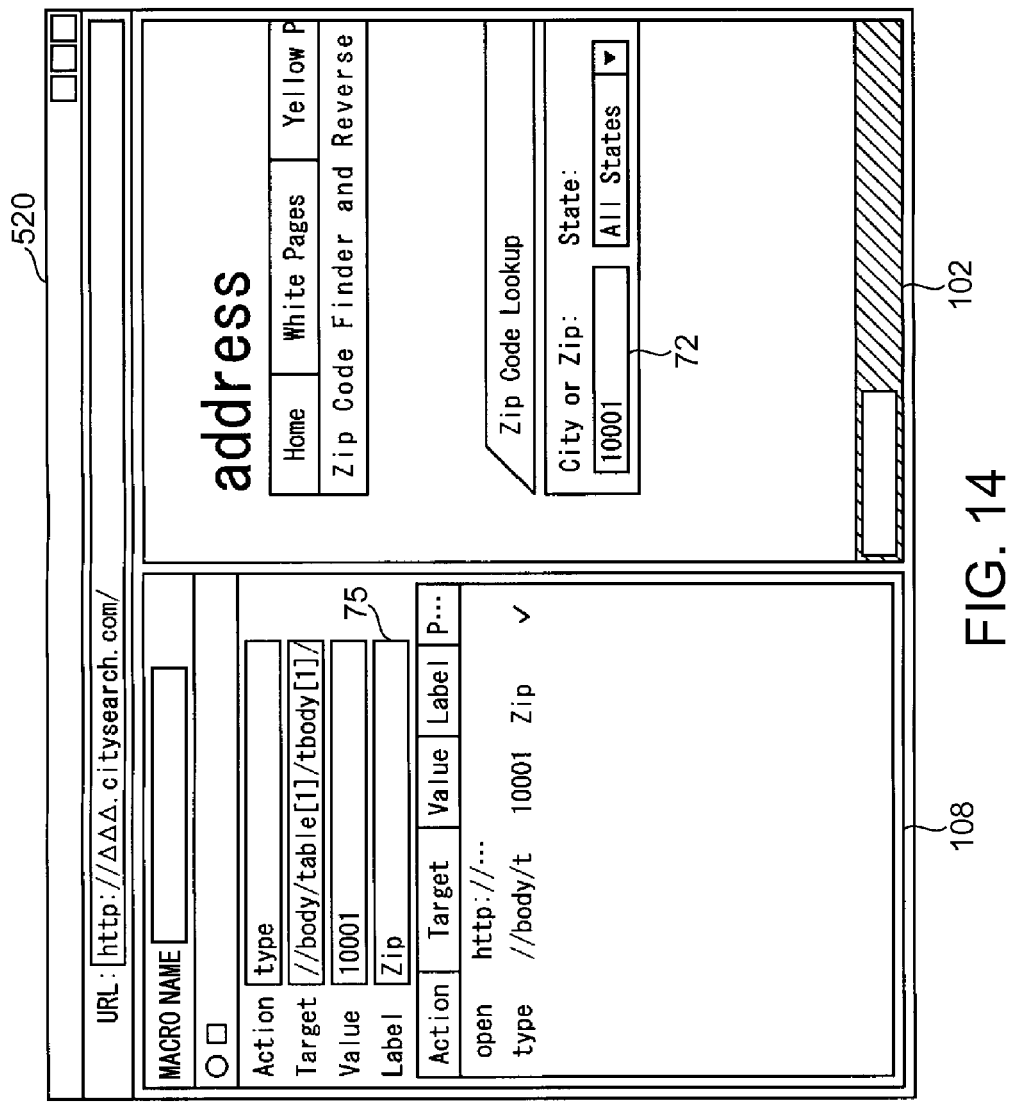
FIG. 14 shows another display example of the display unit 520.
Figure 15:
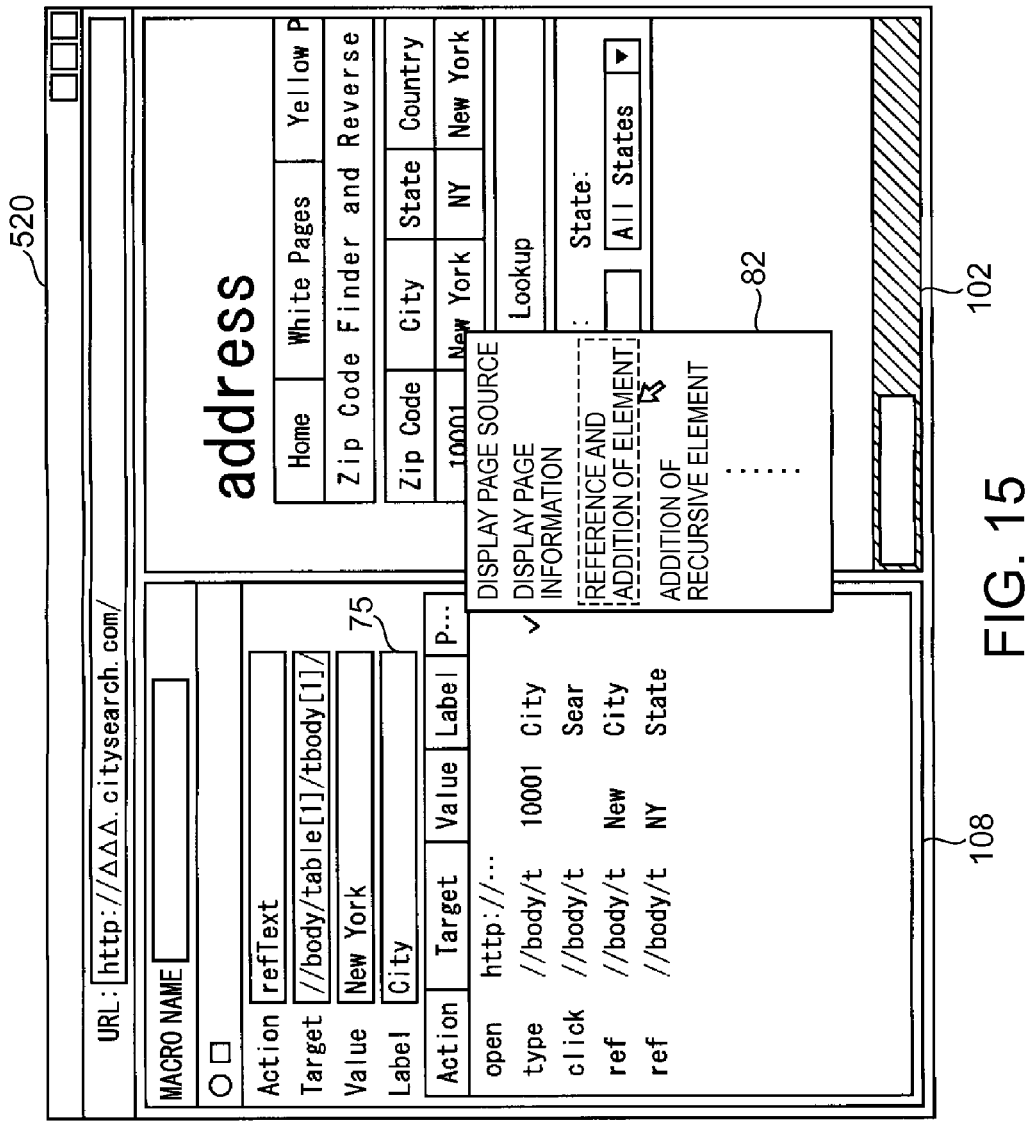
FIG. 15 shows another display example of the display unit 520.
Figure 16:
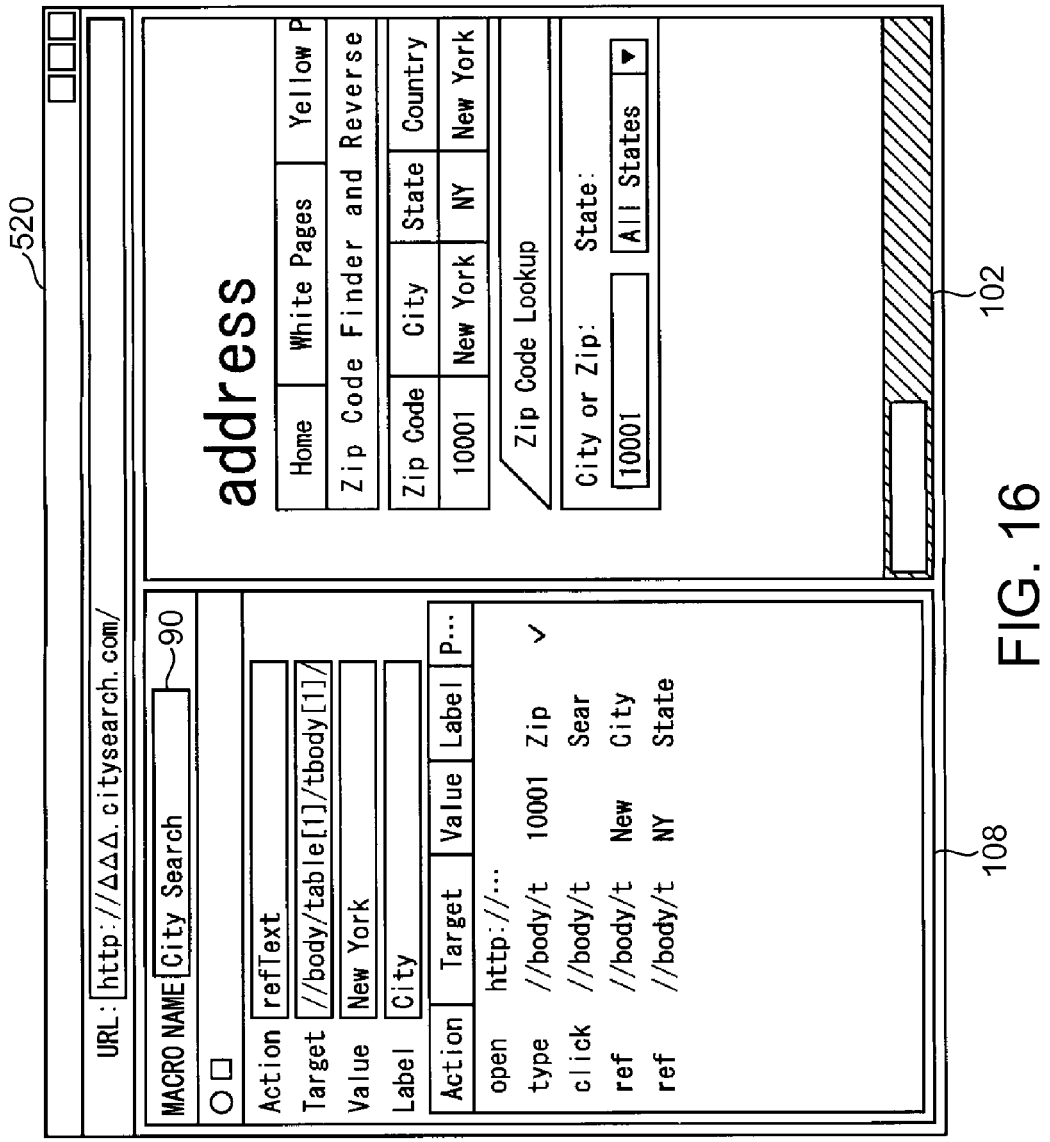
FIG. 16 shows another display example of the display unit 520.

Referring now to FIGS. 14 to 16, an example capable of offering another service will be described below.

FIG. 14 shows another display example of the display unit 520. The display unit 520 displays a web browser 102 as a first screen and a history display screen 108 as a second screen. The web browser 102 reads a file from the address input in the address input field provided with "URL:", and displays the file. As a result, a web site is displayed. When a zip code is input in an input field 72 of the web site, the web site searches a city corresponding to the zip code and displays the name of the city as a character string.

When the user inputs a zip code in the input field 72, the history display screen 108 displays the history of the input operation. In order to associate this history with a label, the user has only to input a character string indicating the label in an input field 75 for inputting the label immediately after the input operation. In response to this, the history acquisition unit 510 associates the label with this history and stores the same. The stored result is displayed on the history display screen 108 as well. Herein, the character string "Zip" input as the label in the input field 72 is displayed on the history display screen 108.

FIG. 15 shows another display example of the display unit 520. When a user inputs a zip code in the input field 72, a function of the web site allows the name of the city as a search result to be displayed. In the example of this drawing, "New York" is displayed as the name of the city corresponding to the zip code of "10001." When the user clicks this city name with a pointing device and then clicks the right mouse button, a context menu 82 will be displayed. When the user selects the item "reference and addition of element" from the context menu, information indicating the location of the character string "New York" in the web page is acquired by the history acquisition unit 510, which is associated with the history and is stored in the storage device 505.

At this time, when the user inputs a character string indicating the label in the input field 75, this label is associated with the location of the display object to be displayed as a result of the operations performed on behalf of the user and is stored in the storage device 505. This label is displayed in association with the display object to be displayed as a result of the operations performed on behalf of the user. The label input in the input field 75 is stored in the storage device 505, and is displayed on the history display screen 108 also. As a result, the location of the city name "New York" is associated with the label "City" and is stored. A similar operation is performed with respect to the name of state "NY," and "State" is input as a label, thereby the label "State" is associated with the location of the state name "NY" and is stored.

FIG. 16 shows another display example of the display unit 520. In this way, a user may provide the history acquired by the history acquisition unit 510 and stored in the storage device 505 with a name. This name is used as a name of a program that makes the client computer 100 function as the input acceptance unit 570 and the processing unit 580, or a definition data defining the operations of this program. For instance, when the user inputs a label "City Search" in an input field 90 and performs an operation so that the history is stored as a file, this label is associated with a program or definition data and is stored.

Referring now to FIGS. 17 to 28, an interface executing the thus created service program and the processing and functions allowing this service program to be combined with another service program and to be executed will be described below.

Figure 17:
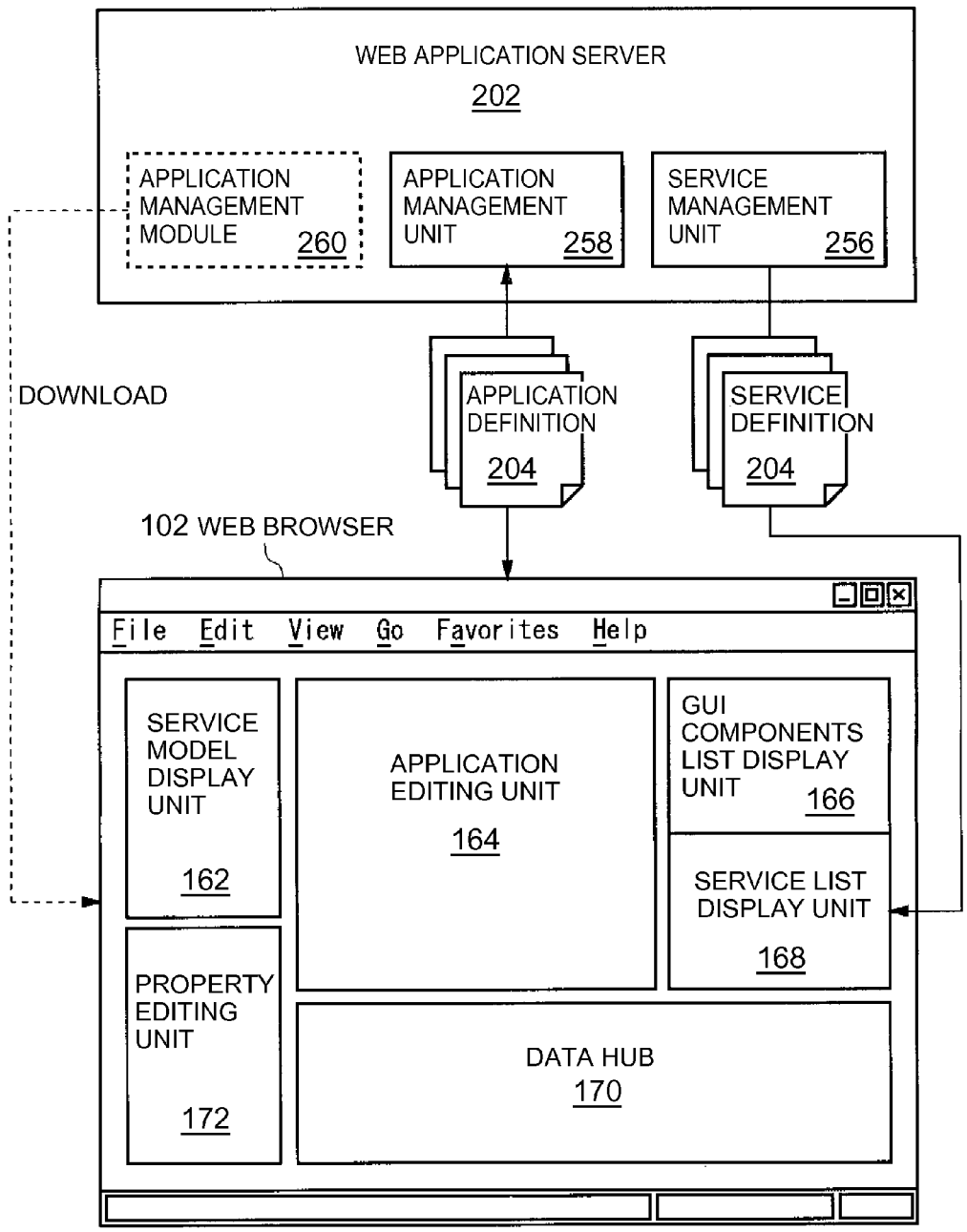
FIG. 17 shows an environment where an application program is developed by combining service programs, together with a screen display relating to this.

FIG. 17 shows an environment where an application program is developed by combining service programs together with a screen display relating to this. When a URL is input for developing an application program on a screen of a web browser 102, the web application server 202 causes a developing environment module to be downloaded from an application management module 260 into the client computer 100. As a result, the web browser 102 displays a screen as shown in FIG. 17, thus enabling the use of the developing environment.

The developing environment consists of a plurality of regions including a service model display unit 162, an application editing unit 164, a graphical user interface (GUI) components list display unit 166, a service list display unit 168, a data hub 170, and a property editing unit 172. In this example, the service model display unit 162 and the GUI components list display unit 166 are palette areas from which GUI components may be attached to the application editing unit 164. Although these areas are sectioned areas like tiles in this example, they may be implemented in a multi-window display form that permits mutual overlapping of individual areas.

Although not illustrated in details, the GUI components list display unit 166 displays GUI components such as a button, an edit area, a memo, a label, a combo box and a radio button, from which these GUI components may be dragged and dropped to the application editing unit 164. The service list display unit 168 reads out, from the hard disk drive 204, service program definitions managed by a service management unit 256 provided in the web application server 202, and displays the list. These service programs may be created by a system administrator beforehand for the purpose of web service access. Alternatively, these service programs may be created by various functions described with reference to FIGS. 1 to 16.

The service model display unit 162 is an area for displaying input elements indicated as trigger elements and output element indicated as Output concerning the services selected by the service list display unit 168, where these elements are displayed hierarchically or schematically. These indicated input elements and output elements may be dragged and dropped in the application editing unit 164 or in the data hub 170 described later. Alternatively, these elements may be dragged and dropped from the application editing unit 164 or from the data hub 170.

As an output element for a service, a list structured with XML may be adopted in addition to a text character string. It should be noted here that, in the case where the output element is a text character string, when such an element is dragged and dropped from there in the data hub 170, it will occupy a single cell in the data hub 170. On the other hand, in the case where an output element is a list, when such an element is dragged and dropped from there in the data hub 170, it will occupy cells corresponding to in number of the character strings or the numerical values included in the list in the data hub 170, and each character string or numeral value corresponding to the list will be stored in the corresponding cell.

GUI components may be dragged and dropped from the GUI component list display unit 166 to the application editing unit 164, whereas Trigger elements, input elements or output elements may be dragged and dropped from the service model display unit 162 to the application editing unit 164. Definitions of the thus created various elements and GUI components are managed by an application management unit 258 provided in the web application server 202 as the definitions of the application program obtained by combining a plurality of service programs, and are stored in the hard disk drive 204 or the like.

When a Trigger element in the service model display unit 162 is attached to the application editing unit 164 and is clicked while executing a program, access to a URL designated for the service will be started. An input element of the service displayed in the service model display unit 162 means a parameter fed when access is made to the URL. For instance, access is made to http://www.CitySearch.com/Search/CGI?&zipcode=98231, zipcode is a parameter input element (hereinafter this may be called a parameter simply) and 98231 is its content. As in http://www.CitySearch.com/Search/CGI?&zipcode=2428502&coutry=Japan, there may be a plurality of parameters. Herein, a web service does not always have an input parameter or an element, and it should be noted that there may be a web service without any input element. For instance, in the case of a web service simply sending back the current Greenwich mean time, no parameter is required.

Meanwhile, when access is made to a web site, data sent back may be HTML, XML, or JSON (JavaScript Object Notation) that is a relatively light data interchange format utilizing the specifications of JavaScript language partially. In this way, when access is made to a web page, the data sent back may be a structured data, and therefore a unit that may be dragged or dropped as an output element of the service model display unit 162 also may be in various formats such as a list as a whole or as a part of the list.

In this example, when access is made to a web site or a web service, asynchronous communication with a server is preferably used, which is called XMLHttpRequest based on the technology called Ajax. With the use of this technology, rewriting of a screen may be speeded up, and data traffic may be reduced. Incidentally, a normal HTTP protocol command may be used also.

The data hub 170 as a data linkage area preferably has an interface appearing as a spreadsheet (called a spreadsheet program also), and consists of sections divided horizontally and vertically. These sections will be called cells named A1, A2, B1 and the like, following the custom of a spreadsheet program. In each cell, a user may input a value, or a GUI component may be dragged and dropped therein from those attached to the application editing unit 164. Alternatively, a calculation formula such as =A1+B1 and =A1&","&B1 may be input, which are well-known forms in a spreadsheet. Whether a type formula is allowed depends on codes of the programming using JavaScript or the like. On the other hand, each of these cells may be conversely dragged or dropped to the GUI components attached to the application editing unit 164 or the input elements of the service displayed in the service model display unit 162. That is to say, according to this example, the data hub 170 is devised using functions of JavaScript so as to provide the above-described drag-and drop function and various calculation functions across cells.

The data hub 170 may include a list output element written in XML or the like that is attached as an output element of a web service. In such a case, when such a list output element is dragged and dropped in the data hub 170, cells corresponding to in number of the elements included in the list will be occupied. In the case where a plurality of cells are dragged and dropped from the list in this way, statistical processing may be conducted. Thus, in this example, various statistical functions are prepared for this purpose, such as sum function like =SUM(A1 . . . E1), average function like =AVERAGE (A1 . . . E1), standard deviation function like =STDEVA (A1 . . . E1), maximum function like =MAX(A1 . . . E1) and minimum function like =MIN(A1 . . . E1). The implementation of such formula manipulation with JavaScript has been established as a programming technique, and therefore detailed description thereof will be omitted.

A cell of the data hub 170 in which the user inputs a calculation formula generally is dragged and dropped in an input element, a trigger element and the like of a service model displayed by the service model display unit 162, and is associated therewith. However, the function of the client developing environment of FIG. 17 may be set as follows: instead of dragging and dropping the cell to such elements, it may be dragged and dropped directly at a blank area of the application editing unit 164, for example, where GUI components for a text input area may be attached automatically, so as to allow a value of the cell of the data hub 170, from which the drag-and-drop operation originates, to be associated therewith. For instance, the drag-and-drop operation from the GUI component list display unit 166 to the application editing unit 164 causes the arrangement of the selected GUI components over the application editing unit 164 by a common technology. Therefore, with the use of technology similar to this, a function may be provided to the client developing environment so as to enable the following process to be performed automatically: in response to a drag-and-drop operation from a cell of the data hub 170 to a blank area of the application editing unit 164, a GUI component indicating a text input area is attached at the position subjected to the drag-and-drop operation, followed by an associating operation of the text input region with the cell of the data hub 170 where the drag-and-drop operation originates.

The property editing unit 172 functions to set or change attributes of GUI components or input/output elements of a service attached to the application editing unit 164 and selected by clicking a mouse, where the attributes include color, font, display/nondisplay, Enable/Disable and the like.

The following describes a specific example of operations for developing an application. Herein, a user intends to create an application program for (1) acquiring data about a city and a state by inputting a zipcode to a service program named CitySearch, (2) combining data of the city and the state to access a service program named MapCode, and (3) obtaining the latitude and the longitude of the city. It should be noted that CitySearch sends back data of the city and the state individually, whereas MapCode demands the combined data of the city and the state. In order to handle these operations automatically, the features of the present embodiment will be favorably utilized.

Figure 18:
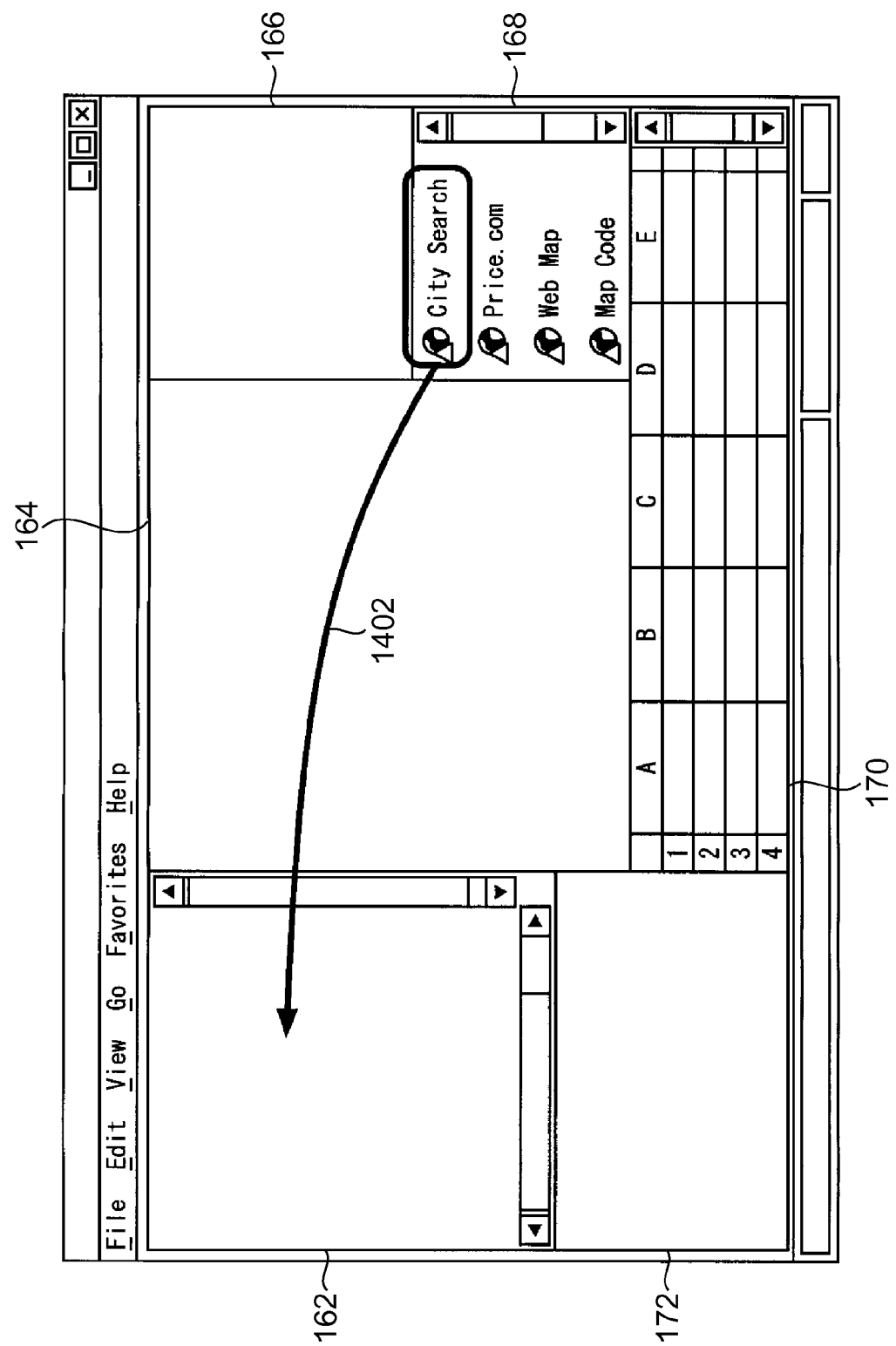
FIG. 18 shows a specific example of a screen for developing an application program.

Referring now to FIG. 18, an initial screen for newly developing an application is shown. Incidentally, since the GUI components list display unit 166 and the property editing unit 172 have less to do with the following description, these units have been omitted in this drawing. On this screen, a user drags and drops CitySearch from the service list display unit 168 to the service model display unit 162 as indicated by the arrow 1402.

Figure 19:
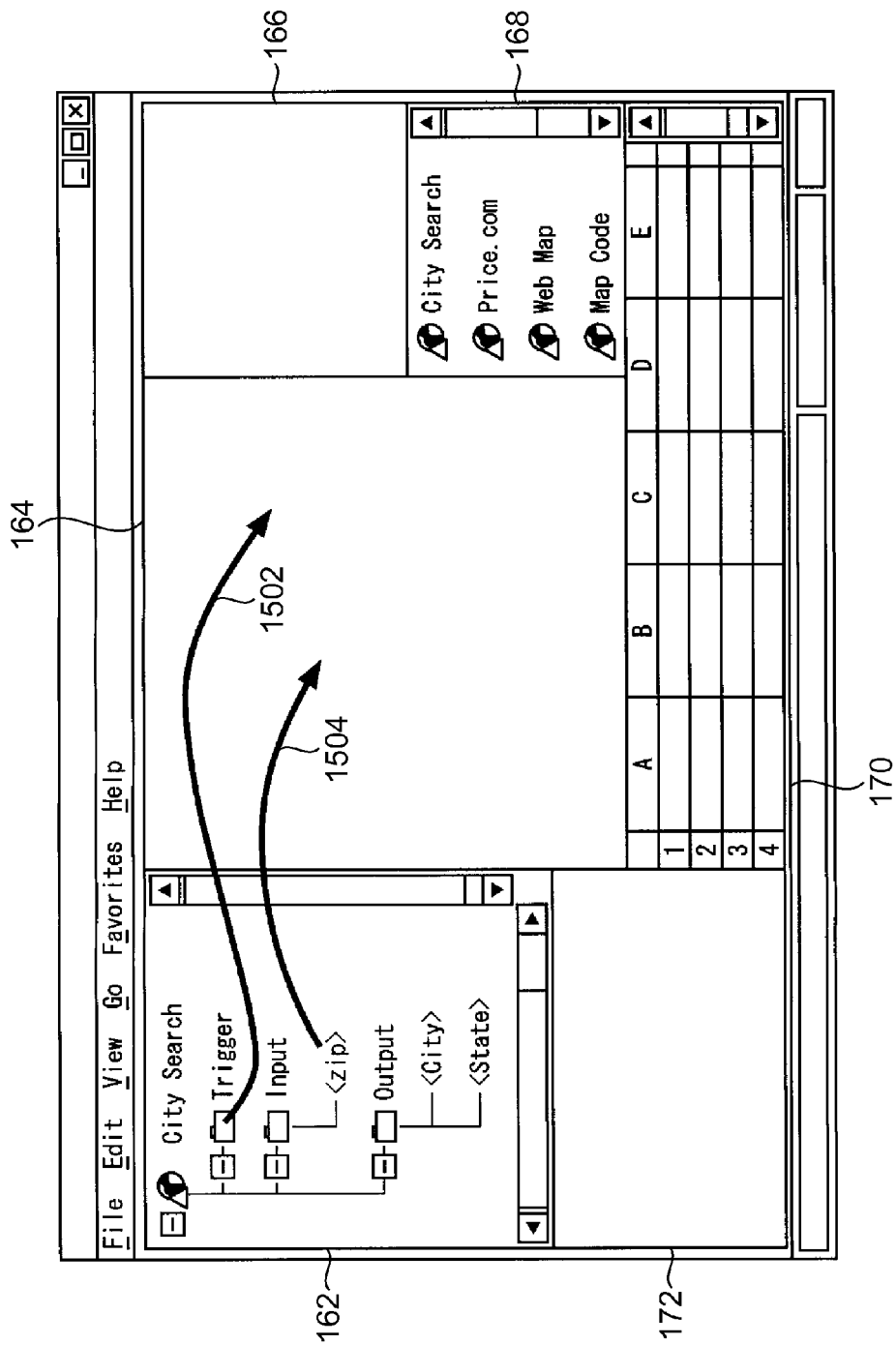
FIG. 19 shows a specific example of a screen for developing an application program.

Then, as shown in FIG. 19, the service model display unit 162 displays a configuration including input and output of CitySearch. This configuration may be created by a system administrator, for example, beforehand to be adaptable to CitySearch. In the case where the service program is created by the functions described referring to FIGS. 1 to 16, an input parameter set as "open" in the service definition is displayed as Input element or Trigger element in the service model display unit 162. A display object set to be displayed as a result of the execution of the service program is displayed as Output element in the service model display unit 162.

Then, in FIG. 19, trigger of CitySearch is dragged and dropped from the service model display unit 162 to the application editing unit 164 as indicated by the arrow 1502, and input1 (zip) of CitySearch is dragged and dropped to the application editing unit 164 as indicated by the arrow 1504.

Figure 20:
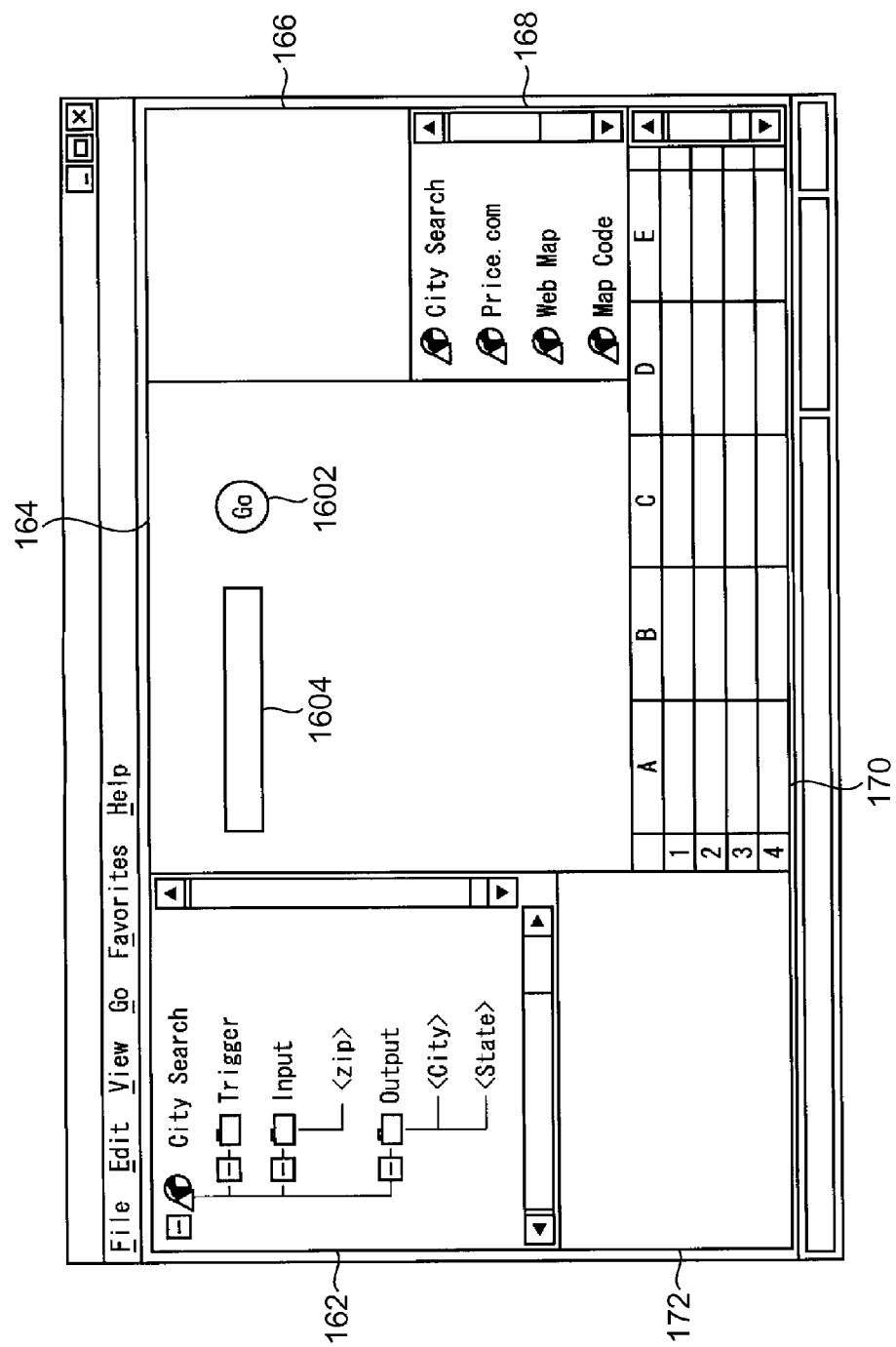
FIG. 20 shows a specific example of a screen for developing an application program.

Consequently, as shown in FIG. 20, the position to which trigger is dragged and dropped becomes a button 1602 including characters of "Go," and the position to which input1 is dragged and dropped becomes a text input field 1604.

Figure 21:
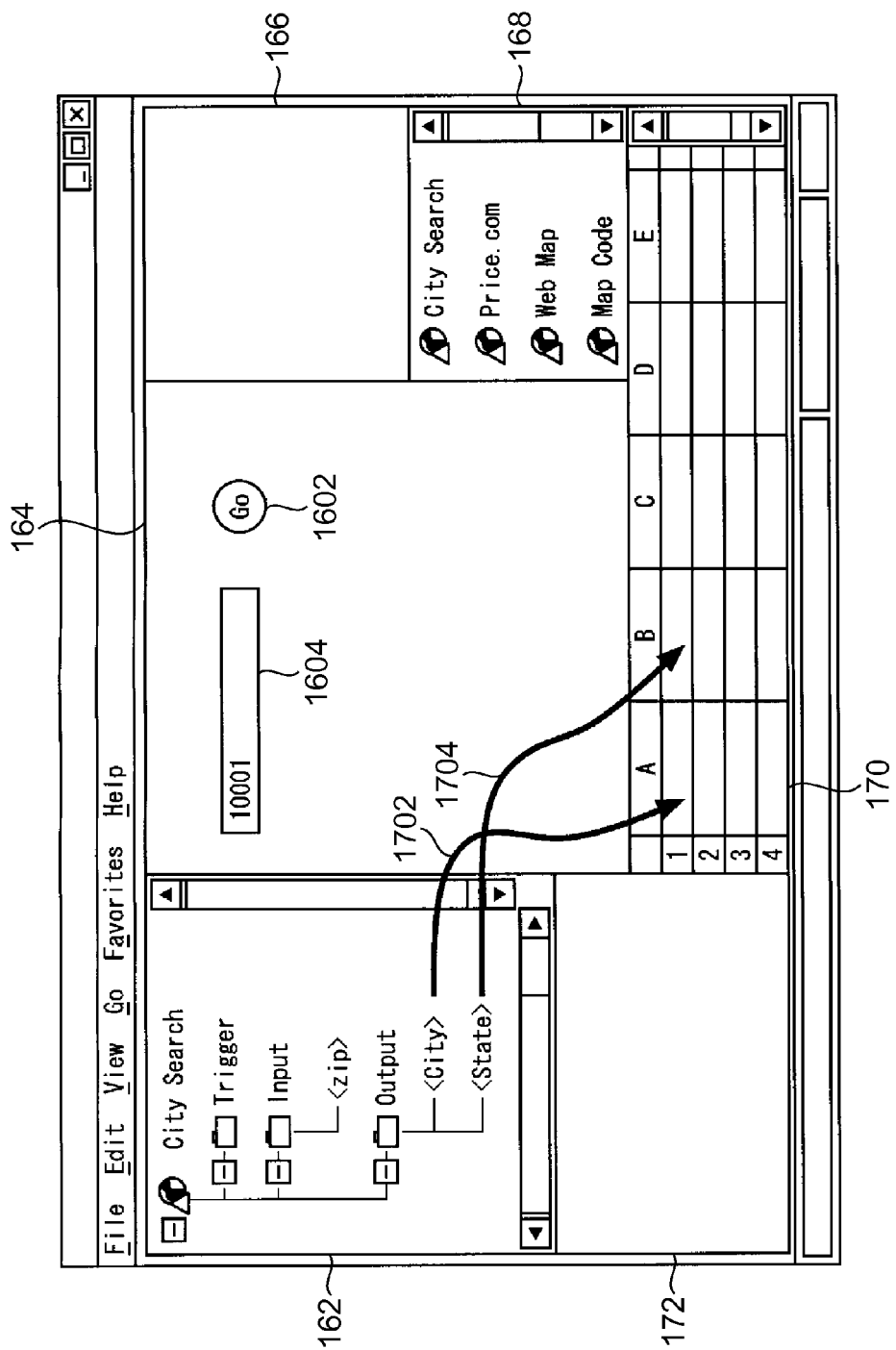
FIG. 21 shows a specific example of a screen for developing an application program.

Then, as shown in FIG. 21, when zipcode of 10001 is input in the text input field 1604 and the button 1602 is clicked, access is made to CitySearch via the web application server 202 using the parameter of zipcode=10001. CitySearch returns 'New York' as <City> and 'NY' as <State>, respectively. Then, the user drags and drops <City> as Output of CitySearch in the service model display unit 162 to the cell A1 of the data hub 170 as indicated by the arrow 1702, and similarly drags and drops <State> as Output to the cell B1 of the data hub 170 as indicated by the arrow 1704.

Figure 22:
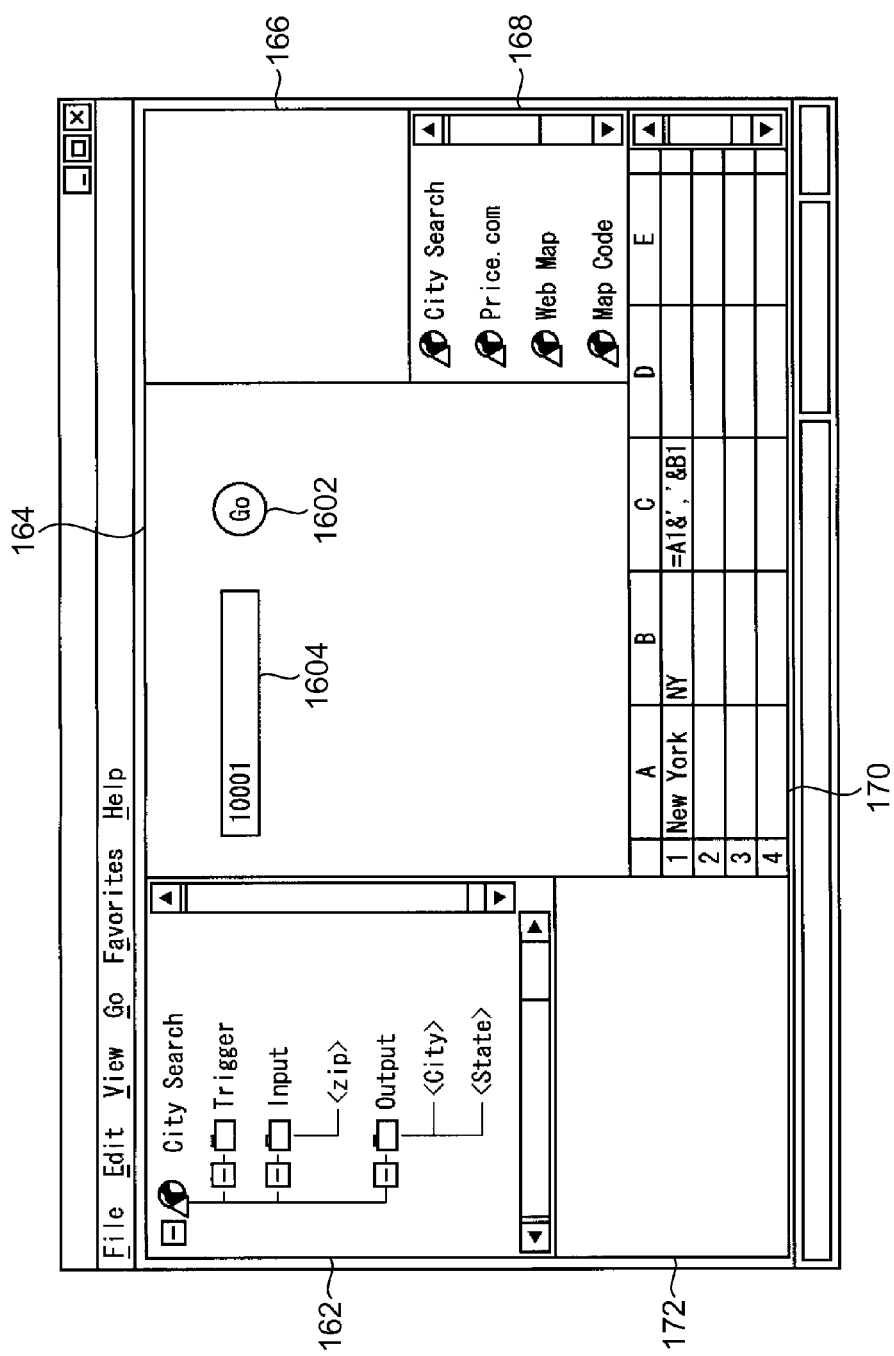
FIG. 22 shows a specific example of a screen for developing an application program.

Consequently, the cell A1 and the cell B1 are bound to <City> and <State>, respectively, and therefore as shown in FIG. 22, 'New York' is displayed in the cell A1 of the data hub 170 and 'NY' is displayed in the cell B1.

Figure 23:
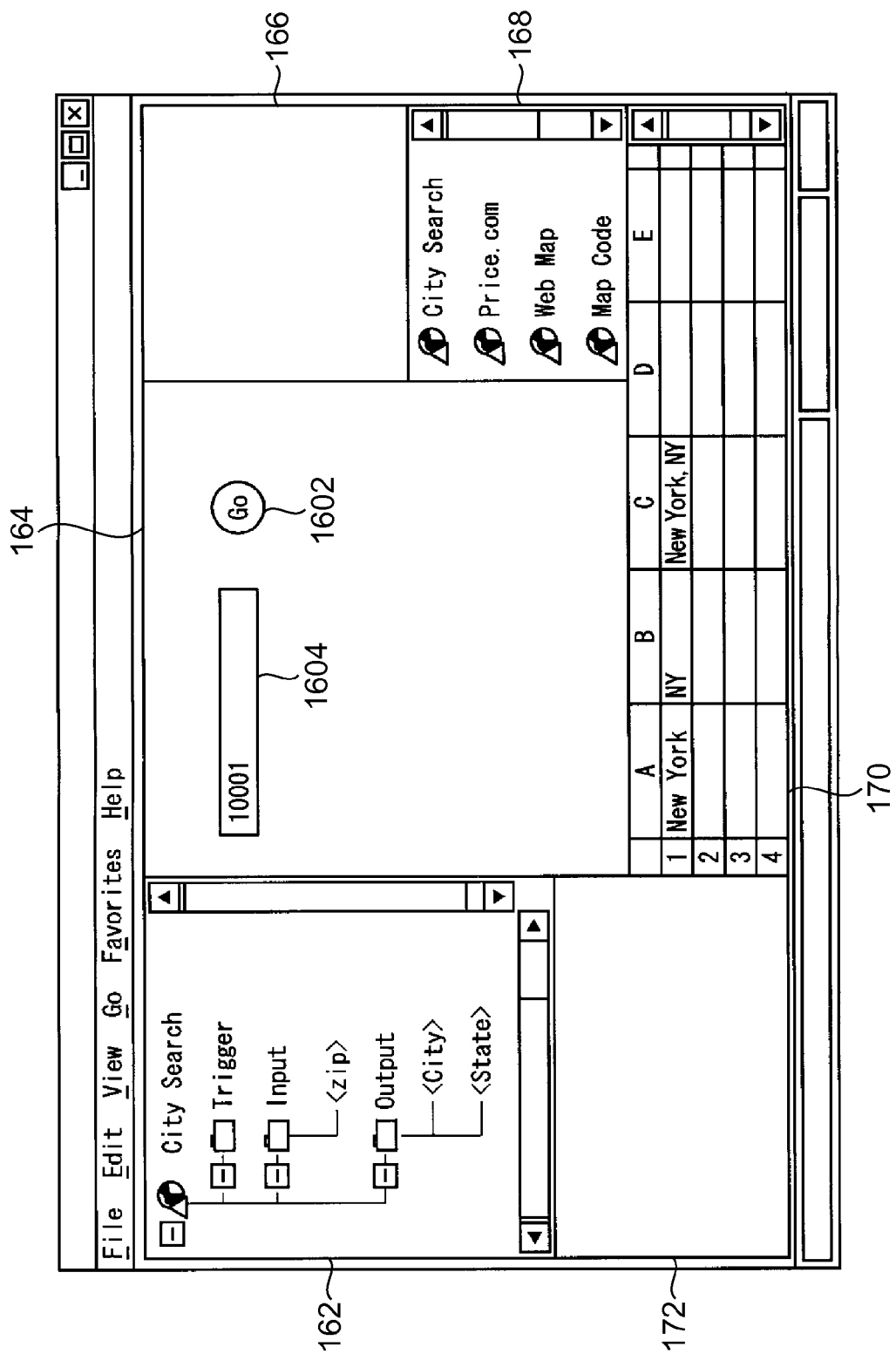
FIG. 23 shows a specific example of a screen for developing an application program.

Then, the user inputs, in the cell C1 of the data hub 170, a calculation formula of =A1&','&B using the character string conjunction operator of &, and presses an end-of-line key. Then, as shown in FIG. 23, calculation is carried out with the calculation formula, and 'New York, N.Y.' is displayed in the cell C1. Note here that although the rule of the operator is coded using JavaScript following a common style in a normal spreadsheet program, common notation in other program languages such as =A1+','+B2 will be permitted. Further, it will be clear for a person skilled in the art that any operation may be conducted such as addition, subtraction and other mathematical functions, in addition to the character string conjunction operator.

In this example, output from the web service is stored in both of the cell A1 and the cell B1. However, various application examples may be considered, for example, the user may input a character string directly in one of the cells, or a calculation formula including the reference to another cell may be used.

Figure 24:
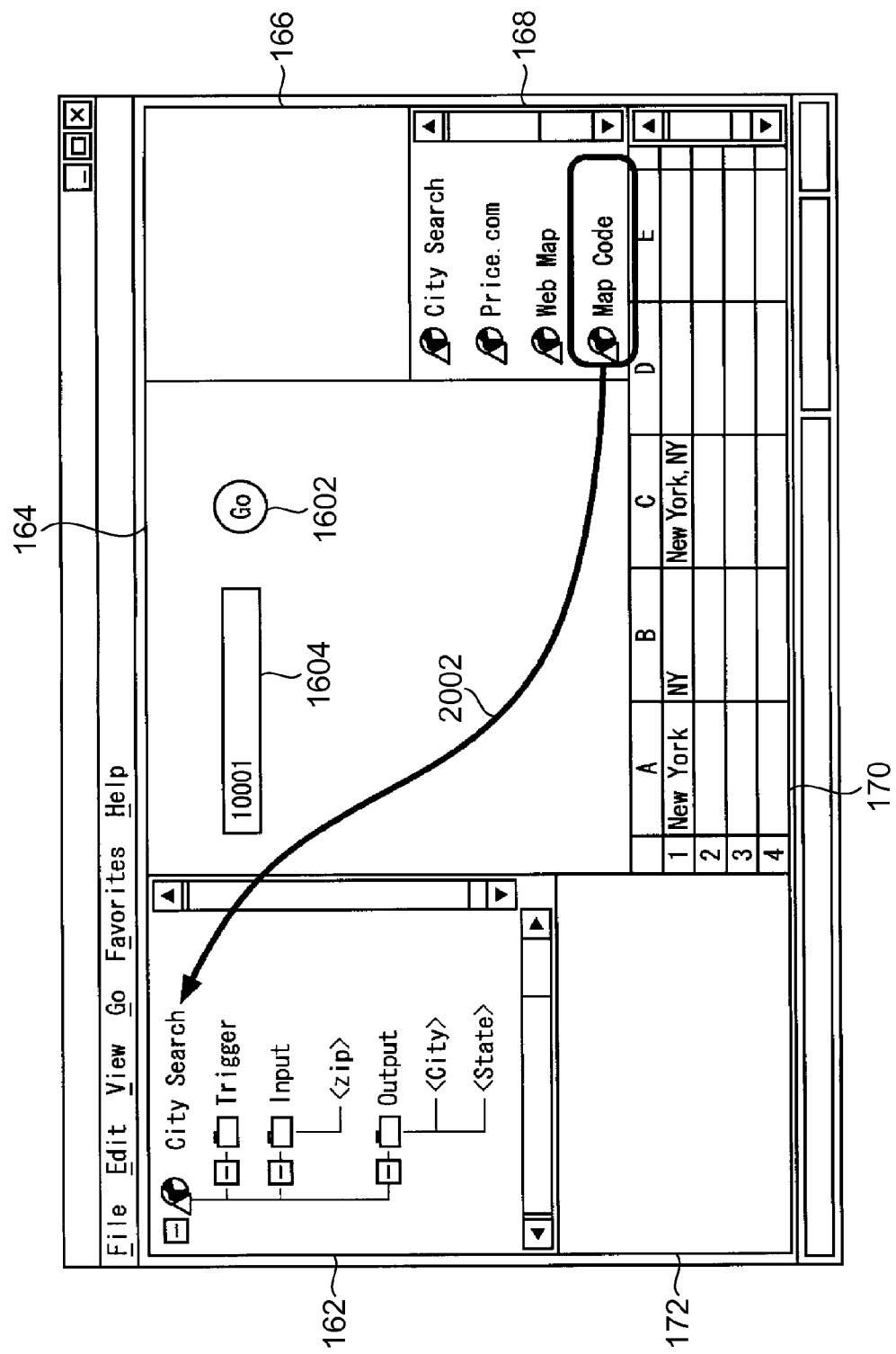
FIG. 24 shows a specific example of a screen for developing an application program.
Figure 25:
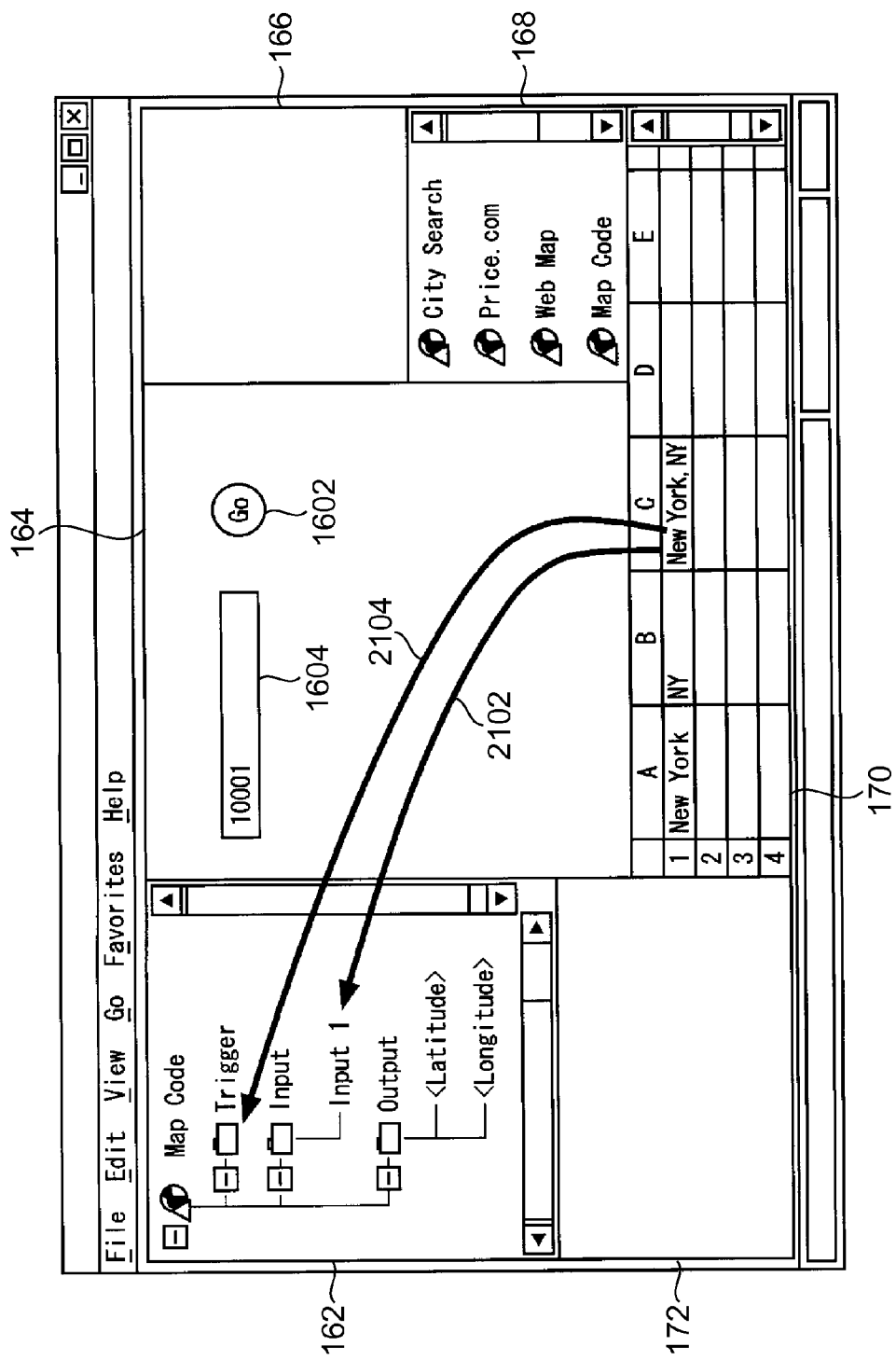
FIG. 25 shows a specific example of a screen for developing an application program.

Next, as shown in FIG. 24, MapCode is dragged and dropped from the service list display unit 168 to any region of the service model display unit 162 as indicated by the arrow 2002. Then, as shown in FIG. 25, the service model display unit 162 displays a configuration including input/output of MapCode. This configuration may be created by a system administrator beforehand to be adaptable to MapCode.

Then, on the screen of FIG. 25, the user drags and drops the cell C1 of the data hub 170 to each of Trigger and Input1 of MapCode inside the service mode display unit 162 as indicated by the arrows 2102 and 2104. The reason for dragging and dropping not only Input1 but also Trigger is for allowing the access to MapCode to be made automatically in response to a change in the value of cell C1 of the data hub 170 where Input1 is set as the parameter.

Incidentally, at this time, instead of dragging and dropping the cell C1 directly to Input1 of MapCode displayed in the service list display unit 168, Input1 of MapCode may be dragged and dropped once to the application editing unit 164, and the cell C1 may be dragged and dropped to the position subjected to the drag-and-drop operation in the application editing unit 164. Even in this case, although the value of the cell C1 is still provided to Input1 of MapCode, such an operation allows the user to confirm the value provided at Input1 of MapCode on the screen during the progress of the operation, when the application is activated later.

Figure 26:
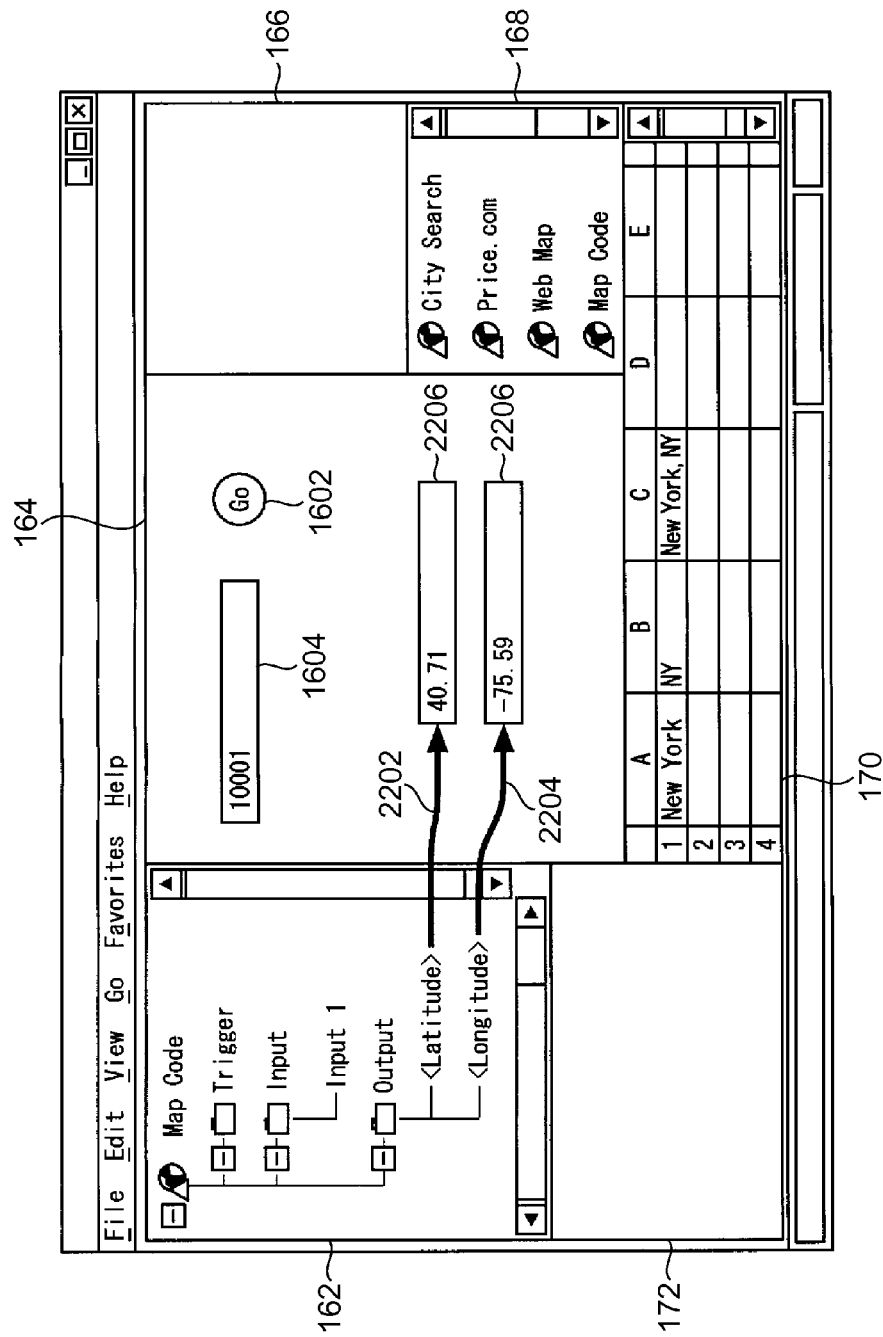
FIG. 26 shows a specific example of a screen for developing an application program.

In response to this drag-and-drop operation, Trigger of MapCode is changed from the state of not associated at all to the associated state, thus making access to MapCode with the parameter of New York, N.Y. Then, MapCode returns <latitude>=40.71 and <longitude>=−75.59 as the latitude and the longitude of New York city, respectively. Then, <latitude> and <longitude> as output of MapCode are dragged and dropped from the service model display unit 162 to the application editing unit 164 as indicated by the arrows 2202 and 2204, respectively, thus actually making these values visible on the application editing unit 164 as text output fields 2206. FIG. 26 illustrates this state.

Figure 27:
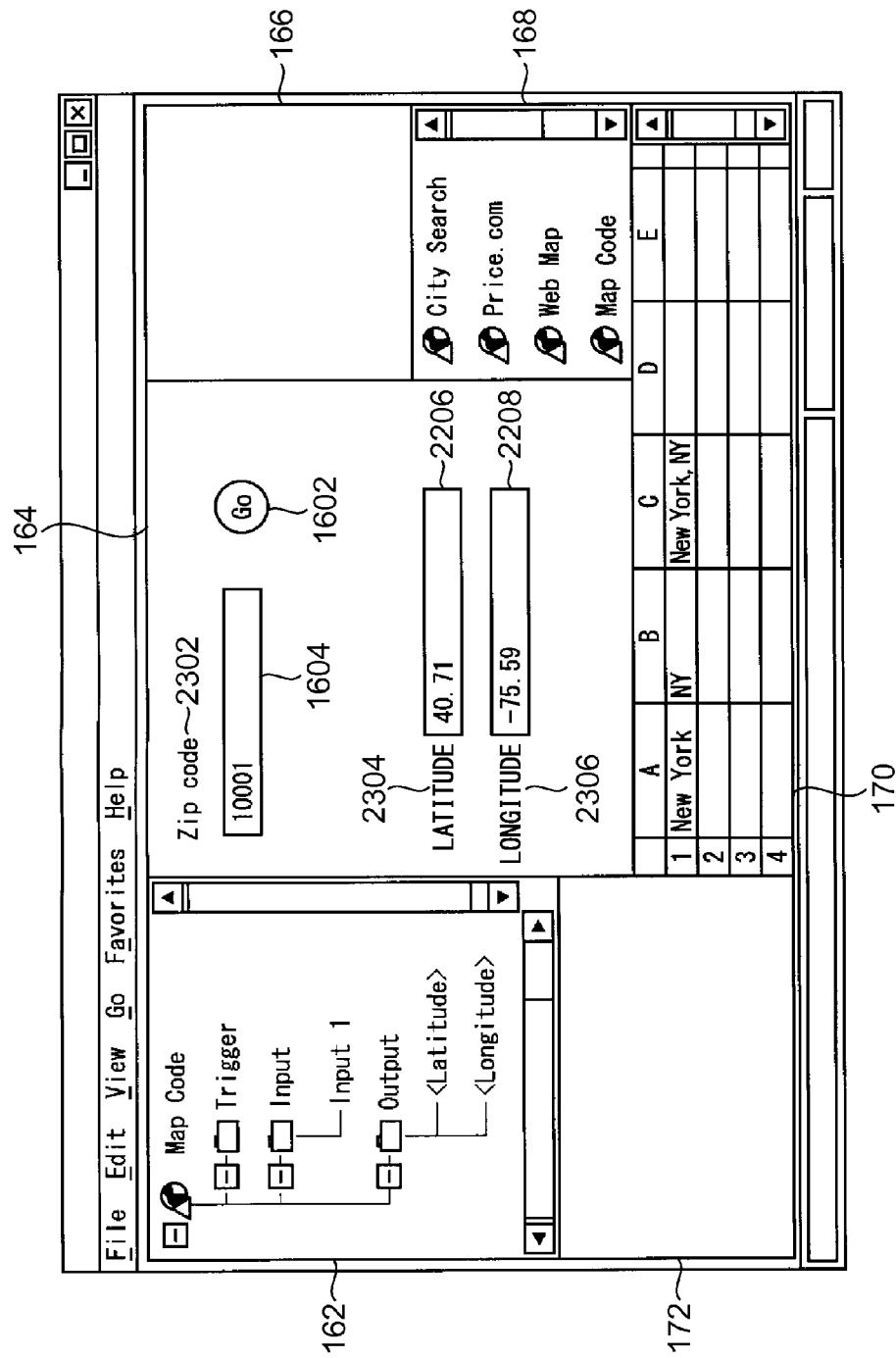
FIG. 27 shows a specific example of a screen for developing an application program.

Then, the application has been almost complete. As shown in FIG. 27, however, the user is allowed to add character strings 2302, 2304, and 2306 as appropriate for explanation in an easy-to-understand manner, and then saves the application program. The thus saved application program may be activated based on a user's instruction, so as to display an input field and start to provide a service in response to the input of a parameter.

For instance, firstly in response to the action from the service program providing CitySearch, the input acceptance unit 570 starts the operation to display the text input field 1604 and the button 1602 for accepting Zipcode as an input parameter. Then, if this parameter is input, the processing unit 580 causes various events specified by the service definition to be generated in the web browser. If the service program is created based on operations history, this process will be operations performed on behalf of the user. Then, the processing unit 580 selects a display object set beforehand from the web page displayed on the web browser as a result of the operations performed on behalf of the user, and displays it as a result of the operations performed on behalf of the user. For instance, in the example of FIG. 27, the result is displayed in the text output field 2206 and the text output field 2208.

According to the example described above with reference to FIGS. 17 to 27, a user's intuitive GUI operations allow a service program to be combined with various GUI elements or to be combined with other service programs, thus creating an application program. In this way, although a service program may be operated alone or a plurality of services may be combined, highly advanced processing may be realized by making the service program function as one component of an application program.

Figure 28:
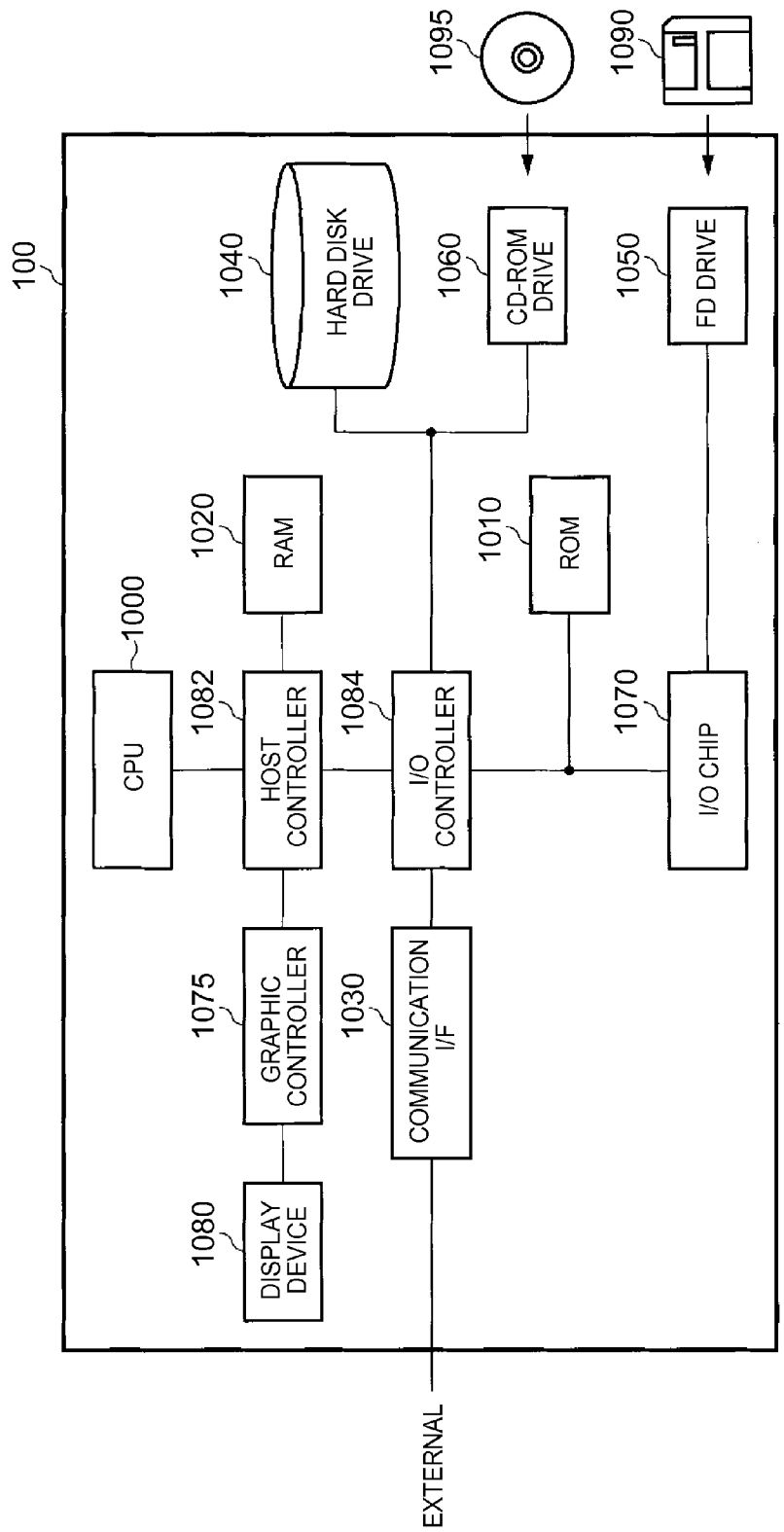
FIG. 28 shows an exemplary hardware configuration of the client computer 100.

FIG. 28 shows an exemplary hardware configuration of the client computer 100. The client computer 100 includes a CPU peripheral unit including a CPU 1000, a RAM 1020 and a graphic controller 1075, which are connected with each other via a host controller 1082, a communication interface 1030 connected with the host controller 1082 via an input/output controller 1084, an input/output unit including a hard disk drive 1040 and a CD-ROM drive 1060, and a legacy input/output unit including a ROM 1010, a flexible disk drive 1050 and an input/output chip 1070 connected with the input/output controller 1084.

The host controller 1082 connects the RAM 1020, the CPU 1000 accessing the RAM 1020 at a high transmission rate, and the graphic controller 1075. The CPU 1000 operates based on programs stored in the ROM 1010 and the RAM 1020, and controls respective units. The graphic controller 1075 acquires image data generated by the CPU 1000 or the like on a frame buffer provided in the RAM 1020, and causes the display device 1080 to display the image data. Alternatively, the graphic controller 1075 may include internally a frame buffer storing image data generated by the CPU 1000 or the like.

The input/output controller 1084 connects the host controller 1082, the communication interface 1030 that is a relatively high-speed input/output device, the hard disk drive 1040, and the CD-ROM drive 1060. The communication interface 1030 communicates with external devices via network. The hard disk drive 1040 stores a program and data used by the client computer 100. The CD-ROM drive 1060 reads out a program or data from a CD-ROM 1095, and provides it to the RAM 1020 or the hard disk drive 1040.

The input/output controller 1084 is further connected with the ROM 1010, the flexible disk drive 1050, the input/output chip 1070 and the like, which are relatively low-speed input/output devices. The ROM 1010 stores a boot program executed by the CPU 1000 when the client computer 100 is activated, a program dependent on hardware of the client computer 100 and the like. The flexible disk drive 1050 reads out a program or data from a flexible disk 1090, and provides it to the RAM 1020 or the hard disk drive 1040 via the input/output chip 1070. The input/output chip 1070 connects various input/output devices via the flexible disk 1090, a parallel port, a serial port, a keyboard port, a mouse port or the like.

A program is provided to the client computer 100 by a user where the program is stored in a storage (e.g., recording) medium such as a flexible disk 1090, a CD-ROM 1095, or an IC card. The program is read out from the recording medium via the input/output chip 1070 and/or the input/output controller 1084, and is installed in the client computer 100 for execution. The program makes the client computer 100 or the like perform the same operations by the client computer 100 as those described referring to FIGS. 1 to 27, and therefore their description will be omitted.

The above-described programs may be stored in an external recording medium. Typical recording media include an optical recording medium such as DVD or PD, a magnetooptical recording medium such as MD, a tape medium, a semiconductor memory such as IC card as well as a flexible disk 1090 and a CD-ROM 1095. Alternatively, a storage device such as a hard disk or a RAM provided in a server system connected with private communication network or the Internet may be used as a recording medium, and a program may be provided to the client computer 100 via the network.

As stated above, the present invention has been described by way of embodiments. However, the technical scope of the present invention is not limited to the above-described embodiments. It will be appreciated for a person skilled in the art that the above-stated embodiments may be modified and improved in various ways. Embodiments modified or improved in such a way also are intended to be embraced in the technical scope of the present invention, which is clear from the appended claims.

What is claimed is:

1. A system, comprising:
a storage device;
a history acquisition unit that selectively acquires user-selected web page service elements as a history of the user-selected web page service elements, where the user-selected web page service elements are individually acquired in response to an instruction from a user using operations with a web browser to associate the user-selected web page service elements and operations performed with the associated user-selected web page service elements with the history, and that stores the history in the storage device;
a search unit that accesses the storage device to search a history of a first operation and a history of a second operation associated with a user-selected web page service element, where in the first operation a parameter is input in a web page, and the second operation is another operation performed after the first operation; and
a generation unit that generates a new service program that is used to provide services by selectively combining a user-identified plurality of the user-selected service elements stored within the history that the user has identified through user-selection operations with an application programming interface (API) of the plurality of the user-selected web page service elements stored within the history to be combined into the new service program, and that stores the new service program in the storage device,
where the new service program makes a computer function as:
an input acceptance unit that accepts input of a new parameter that is to be input to the web page instead of the parameter input through the first operation; and
a processing unit that performs, in response to the input of the new parameter, processing of inputting the new parameter in the web page and processing associated with the second operation beforehand in this stated order with respect to the web browser; and
where the history acquisition unit stores, as a history, a set of web browser activation operations, and an address of the web page to be displayed on an activated web browser; and
where the processing unit calls up the API to activate the web browser and the new service program, where arguments comprise the address of the web page.

2. The system according to claim 1, where:
the history acquisition unit stores a history of two or more services that the user receives from one or more web sites through the operations of the web browser; and
the generation unit generates the new service program to provide a new service obtained by combining user-identified elements of the two or more services received through the operations of the web browser to make the computer function as the input acceptance unit and the processing unit, and stores the new service program in the storage device.

3. The system according to claim 1, further comprising a parameter setting unit that sets, for a parameter acquired as part of the user-selected web page service element of the history of the first operation stored in the storage device, an indication as to whether or not the parameter is to be used for processing by the processing unit based on the user's instruction, and stores a result of the setting in the storage device;
where in the case of the first operation with the parameter acquired as the part of the user-selected web page service element of the history that is set to indicate that the parameter is not to be used for the processing by the processing unit, the input acceptance unit accepts input of the new parameter for the first operation and the processing unit performs processing of inputting of the new parameter in the web page from where the user-selected web page service elements was acquired; and
in the case of the first operation with the parameter acquired as the part of the user-selected web page service element of the history that is set to indicate that the parameter is to be used for the processing by the processing unit, the processing unit performs processing associated with the first operation beforehand with respect to the web browser and the web page from where the user-selected web page service elements was acquired.

4. The system according to claim 3, where:
the web browser displays a new web page comprising a plurality of display objects by reading out a file defining arrangement of the plurality of display objects using a tree-structure data; and
further comprising an object selection unit that selects, from the new web page displayed on the web browser that the user operates, a display object designated by the user and other display objects that share an ancestor display object with the designated display object in the tree-structure data as display objects to be displayed as a result of the processing by the processing unit.

5. The system according to claim 1, further comprising an object selection unit that selects, from the web page displayed on the web browser that the user operates, a display object as the user-selected web page service element based on the user's instruction, associates a location of the display object in the web page with the user-selected web page service element within the history of the user-selected web page service elements, and stores a result of the association in the storage device; and
where the processing unit selects the display object corresponding to the location stored in the storage device from the web page displayed on the web browser subjected to processing corresponding to the operations, and outputs the selected display object as a result of the processing by the processing unit.

6. The system according to claim 5, further comprising a display unit that displays a first screen and a second screen within a single user interface, the first screen displaying the web browser that the user operates and the second screen displaying a list of the history of the user-selected web page service elements stored in the storage device; and
where the object selection unit accepts an instruction from the user to associate the display object on the first screen with the history of the user-selected web page service elements on the second screen, thus selecting the display object to be selected and acquired from the web page displayed as a result of processing corresponding to the associated operations.

7. The system according to claim 1, where:
the history acquisition unit stores, for the first operation, a set of a type of operation, a location of a display object as an operation target in the web page, and an input parameter as the history of the first operation; and
the processing unit activates the web browser, and in response to input of the new parameter, inputs the new parameter to the display object displayed at the location stored as the history of the first operation on the web browser, instead of the parameter stored as the history.

8. The system according to claim 7, where:
the history acquisition unit further stores, as the history of the first operation, a label that allows the user to identify an input field where the user inputs a parameter in the web page, and
the input acceptance unit displays the label stored as the history of the first operation in association with the input field for inputting a new parameter, thus accepting input of the new parameter from the user.

9. The system according to claim 1, where the processing unit issues, for a respective operation, an instruction to generate, in the web browser, an event that the web browser generates if the web browser undergoes the respective operation.

10. The system according to claim 9, where:
the history acquisition unit stores, as a history, a set of clicking operations with a pointing device and a location of a display object clicked with the pointing device; and
the processing unit calls up the API that generates the event in the web browser, where arguments comprise the location of the display object clicked with the pointing device and a type of the event that is generated if the location is clicked with the pointing device.

11. The system according to claim 9, where:
the history acquisition unit stores, as a history, a set of parameter input operations, a location of a display object where a parameter is input, and an input parameter; and
the processing unit calls up the API that generates the event in the web browser, where arguments comprise a type of the event that is generated if the parameter is input, the location of the display object where the parameter is input, and the parameter stored as the history or the new input parameter.

12. The system according to claim 9, where:
the history acquisition unit stores, as a history, a set of drag-and-drop operations of a display object, identification information on a first display object to be dragged, and identification information on a second display object as a dropping target; and
the processing unit calls up the API that generates the event in the web browser, where arguments comprise a type of an operation indicating a drag-and-drop operation, the identification information on the first display object to be dragged, and the identification information on the second display object as the dropping target.

13. The system according to claim 1, where the processing unit performs the processing of inputting the new parameter corresponding to the first operation in the web page, and after the expiration of a standby time set by the user beforehand, performs the processing associated with the first operation beforehand.

14. The system according to claim 1, where:
the search unit further searches a history of a third operation and a history of a fourth operation, the third operation being for inputting a parameter and performed after the second operation and the fourth operation being another operation performed after the third operation;
the input acceptance unit accepts, in response to the processing associated with the second operation beforehand performed by the processing unit, input of another new parameter that is to be input to the web page instead of the parameter input through the third operation; and
the processing unit performs, in response to the input of the new parameter, processing of inputting the new parameter in the web page and processing associated with the fourth operation beforehand in this stated order with respect to the web browser.

15. The system according to claim 1, where:
the search unit further searches a history of a third operation and a history of a fourth operation, the third operation being for inputting a parameter and performed after the second operation and the fourth operation being another operation performed after the third operation;
the input acceptance unit accepts, in addition to the new parameter that is to be input to the web page instead of the parameter input through the first operation, input of another new parameter that is to be input to the web page instead of the parameter input through the third operation; and
the processing unit performs, in response to the input of the new parameters, inputting of the new parameter corresponding to the first operation in the web page, processing associated with the second operation beforehand, inputting of the other new parameter corresponding to the third operation in the web page, and processing associated with the fourth operation beforehand in this stated order with respect to the web browser.

16. A method, comprising:
selectively acquiring, using a history acquisition unit of a computer, user-selected web page service elements as a history of the user-selected web page service elements, where the user-selected web page service elements are individually acquired in response to an instruction from a user using operations with a web browser to associate the user-selected web page service elements and operations performed with the associated user-selected web page service elements with the history, and storing the history in a storage device of the computer;
accessing, using a search unit of the computer, the storage device to search a history of a first operation and a history of a second operation associated with a user-selected web page service element, where in the first operation a parameter is input in a web page, and the second operation is another operation performed after the first operation; and
generating, using a generation unit of the computer, a new service program that is used to provide services by selectively combining a user-identified plurality of the user-selected service elements stored within the history that the user has identified through user-selection operations with an application programming interface (API) of the plurality of the user-selected web page service elements stored within the history to be combined into the new service program, and storing the new service program in the storage device,
where the new service program makes the computer function as:
an input acceptance unit that accepts input of a new parameter that is to be input to the web page instead of the parameter input through the first operation; and
a processing unit that performs, in response to the input of the new parameter, processing of inputting the new parameter in the web page and processing associated with the second operation beforehand in this stated order with respect to the web browser; and
where the history acquisition unit stores, as a history, a set of web browser activation operations, and an address of a web page to be displayed on an activated web browser; and
where the processing unit calls up the API to activate the web browser and the new service program, where arguments comprise the address of the web page.

17. A computer program product comprising a computer readable storage medium including computer readable program code, where the computer readable program code when executed on a computer causes the computer to function as:

a history acquisition unit that selectively acquires user-selected web page service elements as a history of the user-selected web page service elements, where the user-selected web page service elements are individually acquired in response to an instruction from a user using operations with a web browser to associate the user-selected web page service elements and operations performed with the associated user-selected web page service elements with the history, and that stores the history in the storage device;

a search unit that accesses the storage device to search a history of a first operation and a history of a second operation associated with a user-selected web page service element, where in the first operation a parameter is input in a web page, and the second operation is another operation performed after the first operation; and a generation unit that generates a new service program that is used to provide services by selectively combining a user-identified plurality of the user-selected service elements stored within the history that the user has identified through user-selection operations with an application programming interface (API) of the plurality of the user-selected web page service elements stored within the history to be combined into the new service program, and that stores the new service program in the storage device, where the new service program makes the computer function as:

an input acceptance unit that accepts input of a new parameter that is to be input to the web page instead of the parameter input through the first operation; and a processing unit that performs, in response to the input of the new parameter, processing of inputting the new parameter in the web page and processing associated with the second operation beforehand in this stated order with respect to the web browser; and where the history acquisition unit stores, as a history, a set of web browser activation operations, and an address of a web page to be displayed on an activated web browser; and where the processing unit calls up the API to activate the web browser and the new service program, where arguments comprise the address of the web page.

18. A system, comprising:

a storage device;

a history acquisition unit that selectively acquires user-selected web page service elements as a history of the user-selected web page service elements, where the user-selected web page service elements are individually acquired in response to an instruction from a user using operations with a web browser to associate the user-selected web page service elements and operations performed with the associated user-selected web page service elements with the history, and that stores the history in the storage device;

an object selection unit that selects, from the web page displayed on the web browser that the user operates, a display object as the user-selected web page service element based on the user's instruction, associates a location of the display object in the web page with the user-selected web page service element within the history of the user-selected web page service elements, and stores a result of the association in the storage device;

a search unit that accesses the storage device to search a history of each of the operations; and a generation unit that generates a new service program that is used to provide services by selectively combining a user-identified plurality of the user-selected service elements stored within the history that the user has identified through user-selection operations with an application programming interface (API) of the plurality of the user-selected web page service elements stored within the history to be combined into the new service program, and that stores the new service program in the storage device, where the new service program makes a computer function as:

a processing unit that performs processing corresponding to the searched operations with respect to the web browser in an order of the operations, selects the display object corresponding to the location stored in the storage device from the web page displayed on the web browser subjected to processing corresponding to the operations, and outputs the display object; and where the history acquisition unit stores, as a history, a set of web browser activation operations, and an address of a web page to be displayed on an activated web browser; and where the processing unit calls up the API to activate the web browser and the new service program, where arguments comprise the address of the web page.

19. The system according to claim 18, further comprising a display unit that displays a first screen and a second screen within a single user interface, the first screen displaying the web browser that the user operates and the second screen displaying a list of the history of the user-selected web page service elements stored in the storage device; and where the object selection unit accepts an instruction from the user to associate the display object on the first screen with the history of the user-selected web page service elements on the second screen, thus selecting the display object to be selected and acquired from the web page displayed as a result of processing corresponding to the associated operations.

20. The system according to claim 18, where:

the history acquisition unit stores a history of two or more services that the user receives from one or more web sites through the operations of the web browser; and the generation unit generates the new service program to provide a new service obtained by combining user-identified elements of the two or more services received through the operations of the web browser to make the computer function as the processing unit.

21. A method, comprising:

selectively acquiring, using a history acquisition unit of a computer, user-selected web page service elements as a history of the user-selected web page service elements, where the user-selected web page service elements are individually acquired in response to an instruction from a user using operations with a web browser to associate the user-selected web page service elements and operations performed with the associated user-selected web page service elements with the history, and storing the history in a storage device of the computer;

selecting, using an object selection unit of the computer based on a user instruction, a display object from a web page displayed on the web browser that the user operates, associating a location of the display object in the web page with the user-selected web page service element within the history of the user-selected web page service elements, and storing a result of the association in the storage device;

accessing, using a search unit of the computer, the storage device to search a history of each of the operations; and generating, using a generation unit of the computer, a new service program that is used to provide services by selectively combining a user-identified plurality of the user-selected service elements stored within the history that the user has identified through user-selection operations with an application programming interface (API) of the plurality of the user-selected web page service elements stored within the history to be combined into the new service program, and storing the new service program in the storage device, where the new service program makes the computer function as:

a processing unit that performs processing corresponding to the searched operations with respect to the web browser in an order of the operations, selects the display object corresponding to the location stored in the storage device from the web page displayed on the web browser subjected to processing corresponding to the operations, and outputs the display object; and where the history acquisition unit stores, as a history, a set of web browser activation operations, and an address of a web page to be displayed on an activated web browser; and where the processing unit calls up the API to activate the web browser and the new service program, where arguments comprise the address of the web page.

22. A computer program product comprising a computer readable storage medium including computer readable program code, where the computer readable program code when executed on a computer causes the computer to function as:

a history acquisition unit that selectively acquires user-selected web page service elements as a history of the user-selected web page service elements, where the user-selected web page service elements are individually acquired in response to an instruction from a user using operations with a web browser to associate the user-selected web page service elements and operations performed with the associated user-selected web page service elements with the history, and that stores the history in the storage device;

an object selection unit that selects, from a web page displayed on the web browser that the user operates, a display object as the user-selected web page service element based on the user's instruction, associates a location of the display object in the web page with the user-selected web page service element within the history of the user-selected web page service elements, and stores a result of the association in the storage device;

a search unit that accesses the storage device to search a history of each of the operations; and a generation unit that generates a new service program that is used to provide services by selectively combining a user-identified plurality of the user-selected service elements stored within the history that the user has identified through user-selection operations with an application programming interface (API) of the plurality of the user-selected web page service elements stored within the history to be combined into the new service program, and that stores the new service program in the storage device, where the new service program makes the computer function as:

a processing unit that performs processing corresponding to the searched operations with respect to the web browser in an order of the operations, selects the display object corresponding to the location stored in the storage device from the web page displayed on the web browser subjected to processing corresponding to the operations, and outputs the display object; and where the history acquisition unit stores, as a history, a set of web browser activation operations, and an address of a web page to be displayed on an activated web browser; and where the processing unit calls up the API to activate the web browser and the new service program, where arguments comprise the address of the web page.

\* \* \* \* \*